(12) United States Patent
Kawasaki

(10) Patent No.: US 7,819,212 B2
(45) Date of Patent: Oct. 26, 2010

(54) POWER OUTPUT APPARATUS AND VEHICLE

(75) Inventor: Koji Kawasaki, Anjo (JP)

(73) Assignees: Toyota Jidosha Kabushiki Kaisha, Toyota (JP); Nippon Soken, Inc., Nishio (JP)

( * ) Notice: Subject to any disclaimer, the term of this patent is extended or adjusted under 35 U.S.C. 154(b) by 108 days.

(21) Appl. No.: 12/320,933

(22) Filed: Feb. 9, 2009

(65) Prior Publication Data

US 2009/0200095 A1    Aug. 13, 2009

(30) Foreign Application Priority Data

Feb. 12, 2008    (JP)    ............................. 2008-030592

(51) Int. Cl.
*B60W 10/00*    (2006.01)
*B60W 10/06*    (2006.01)
*B60W 10/08*    (2006.01)
*B60W 10/10*    (2006.01)

(52) U.S. Cl. .............................. 180/65.265; 180/35.28; 180/65.285; 475/5; 475/211; 475/218; 477/3

(58) Field of Classification Search ............ 180/65.265, 180/65.275–65.285; 475/3, 209, 210, 211, 475/212, 218; 477/3
See application file for complete search history.

(56) References Cited

U.S. PATENT DOCUMENTS 5,073,157 A    12/1991    Herscovici

FOREIGN PATENT DOCUMENTS

| JP | U-02-130448 | 10/1990 |
| JP | A-08-035545 | 2/1996 |
| JP | A-09-046821 | 2/1997 |
| JP | A-10-246305 | 9/1998 |
| JP | A-11-504415 | 4/1999 |
| JP | A-11-180173 | 7/1999 |
| JP | A-2002-139136 | 5/2002 |
| JP | A-2004-175320 | 6/2004 |
| JP | A-2006-327570 | 12/2006 |

*Primary Examiner*—Glenn Dayoan
*Assistant Examiner*—Erez Gurari
(74) *Attorney, Agent, or Firm*—Oliff & Berridge, PLC

(57) ABSTRACT

A hybrid vehicle includes: an engine that can output power to a drive gear; a CVT that can steplessly change the speed of power inputted to a primary shaft and output the power to a secondary shaft; a planetary gear mechanism including a sun gear connected to the secondary shaft, a ring gear that can rotate in a direction opposite to a rotational direction of the drive gear in conjunction with the drive gear, and a carrier connected to a carrier shaft; a clutch that connects and disconnects the drive gear to and from the primary shaft; a motor that can input and output power to the primary shaft; and a battery that can supply and receive electric power to and from the motor.

11 Claims, 10 Drawing Sheets

POWER OUTPUT APPARATUS AND VEHICLE

BACKGROUND OF THE INVENTION

1. Field of the Invention

The present invention relates to a power output apparatus for outputting power to a drive shaft and a vehicle including drive wheels connected to a driveshaft.

2. Description of the Prior Art

Japanese Patent Laid-open No. 2004-175320 discloses a power output apparatus including an infinitely variable transmission (IVT) constituted by a combination of a continuously variable transmission and a planetary gear mechanism, and used as a hybrid vehicle driving apparatus. The power output apparatus includes a motor, a continuously variable transmission, a planetary gear mechanism including a sun gear as a first input element, a carrier as a second input element, and a ring gear as an output element, a high clutch that engages and disengages the sun gear of the planetary gear mechanism with and from an output shaft of the apparatus, and a low clutch that engages and disengages the ring gear of the planetary gear mechanism with and from the output shaft of the apparatus. An input shaft of the continuously variable transmission is connected to an engine and connected to the carrier of the planetary gear mechanism via a parallel gear train. An output shaft of the continuously variable transmission is connected to the sun gear of the planetary gear mechanism and the motor.

In the power output apparatus, a torque circulation mode is set in which the high clutch is disengaged and the low clutch is engaged to cause torque circulation in the continuously variable transmission. In the torque circulation mode, a transmission state of the continuously variable transmission is changed from an acceleration state to a deceleration state to change the sun gear from a high speed (over drive) rotation state at an input speed ratio Ai to a low speed (under drive) rotation speed at an input speed ratio Bi, thereby allowing a speed ratio of the ring gear connected to the output shaft of the apparatus to be changed from a negative speed ratio Ao (reverse state) to a certain speed increasing ratio Bo. In the torque circulation mode, torque from the motor is amplified by the continuously variable transmission, and thus the output shaft can output high torque and a rotation speed of the motor becomes higher than a rotation speed of the output shaft of the apparatus, thereby allowing energy regeneration by the motor in a rotation region with high regenerative efficiency. Further, the power output apparatus disengages the low clutch and engages the high clutch at the time of synchronous rotation between the sun gear and the ring gear to set a direct torque transmission mode. In the direct torque transmission mode, the transmission state of the continuously variable transmission can be changed from a constant speed state to the acceleration state to change a speed ratio of the sun gear as the output element, that is, the output shaft of the apparatus from a constant speed ratio Ci to a high speed ratio Di. In the direct torque transmission mode, torque from the motor can be transmitted to the output shaft without via the continuously variable transmission, thereby allowing transmission efficiency of the motor torque to be increased, and allowing energy regeneration by the motor without a loss in the continuously variable transmission.

In the above described power output apparatus, the torque circulation mode is set to allow high torque to be efficiently outputted to the output shaft in a low speed region. However, in the direct torque transmission mode, only at least one of power from the engine that is changed in speed by the continuously variable transmission and power from the motor can be outputted to the output shaft. Thus, in terms of increasing a range of the transmission gear ratio to increase energy efficiency and torque characteristic in a broad operation region from a low speed region to a high speed region, there is still need for improvement in the conventional power output apparatus.

SUMMARY OF THE INVENTION

The present invention has a main object to provide a power output apparatus that can increase energy efficiency and torque characteristic in a broader operation region, and a vehicle including the power output apparatus.

In order to achieve the above main object, the power output apparatus and the vehicle in accordance with the present invention adopt the following means.

The present invention is directed to a power output apparatus that outputs power to a drive shaft. The power output apparatus includes: a power generation source that can output power to a predetermined rotational element; a continuously variable transmission device that can steplessly change the speed of power inputted to an input shaft and output the power to an output shaft; a planetary gear mechanism including a first input element connected to the output shaft of the continuously variable transmission device, a second input element that can rotate in a direction opposite to a rotational direction of the rotational element in conjunction with the rotational element, and an output element connected to the drive shaft; a connection and disconnection device that connects and disconnects the rotational element to and from the input shaft of the continuously variable transmission device; an electric motor that can output at least power to the input shaft of the continuously variable transmission device; and an accumulator that can supply and receive electric power to and from the electric motor.

In the power output apparatus, the rotational element, the continuously variable transmission device, and the planetary gear mechanism cooperate to constitute a so-called infinitely variable transmission (IVT) when the connection and disconnection device connects the rotational element to the input shaft of the continuously variable transmission device, and power from at least one of the power generation source and the electric motor is outputted separately from the rotational element and the continuously variable transmission device to the planetary gear mechanism to cause torque circulation, and thus a transmission gear ratio between the rotational element and the output element (drive shaft) of the planetary gear mechanism can be set to be theoretically infinite. Specifically, in the power output apparatus, the continuously variable transmission device is used to set the transmission gear ratio between the rotational element and the output element of the planetary gear mechanism to be infinite, and thus the rotation of the output element and the drive shaft can be stopped even if the power generation source connected to the rotational element is operated, for example, at any rotation speed at which efficiency can be increased. If a transmission state of the continuously variable transmission device is changed from the state where the transmission gear ratio is substantially infinite, the output element and the drive shaft can be rotated in a forward direction or a reverse direction. Particularly, when the rotation speed of the drive shaft is low, torque from at least one of the power generation source and the electric motor can be amplified to efficiently output high torque to the drive shaft. When the connection and disconnection device disconnects the rotational element from the input shaft of the continuously variable transmission device, the electric motor can rotate the input shaft of the continuously variable transmission device independently of the rotation of the rotational element. Thus, in the power output apparatus, the rotation of the electric motor connected to the input shaft of the continuously variable transmission device is controlled and further the transmission state of the continuously variable transmission device is changed as appropriate in a state where the rotational element is disconnected from the input shaft of the continuously variable transmission device and the power generation source outputs power, thereby reducing the transmission gear ratio between the rotational element, that is, the power generation source or the electric motor and the output element (drive shaft) of the planetary gear mechanism (increasing a speed increasing ratio). Thus, in the power output apparatus, a range of the transmission gear ratio between the power generation source or the electric motor and the drive shaft can be increased to increase energy efficiency and torque characteristic in an extremely broad operation region from a low speed region where the rotation speed of the drive shaft is low and a high speed region where the rotation speed is high.

The drive shaft may rotate in a forward direction when the output element of the planetary gear mechanism rotates in the direction opposite to the rotational direction of the rotational element. In this configuration, when the drive shaft rotates in the forward direction, both the second input element and the output element of the planetary gear mechanism rotate in a direction opposite to the rotational direction of the rotational element. Thus, if the transmission state of the continuously variable transmission device is changed to an acceleration side from the state where the transmission gear ratio between the rotational element and the output element of the planetary gear mechanism is set to be substantially infinite, the rotation speed of the first input element of the planetary gear mechanism connected to the output shaft of the continuously variable transmission device is increased, and thus high torque can be outputted to the output element of the planetary gear mechanism to rotate the output element in the same direction as the rotational direction of the rotational element, that is, high torque can be outputted to the drive shaft to rotate the drive shaft in the reverse direction. If the transmission state of the continuously variable transmission device is changed to a deceleration side from the state where the transmission gear ratio between the rotational element and the output element of the planetary gear mechanism is set to be substantially infinite, the rotation speed of the first input element of the planetary gear mechanism connected to the output shaft of the continuously variable transmission device is reduced, and thus high torque can be outputted to the output element of the planetary gear mechanism to rotate the output element in the direction opposite to the rotational direction of the rotational element and increase the rotation speed, that is, high torque can be outputted to the drive shaft to rotate the drive shaft in the forward direction and increase the rotation speed. Further, the rotation speed of the electric motor connected to the input shaft of the continuously variable transmission device is reduced and the electric motor is once stopped in the state where the connection and disconnection device disconnects the rotational element from the input shaft of the continuously variable transmission device, and thus the rotation speed of the first input element of the planetary gear mechanism connected to the output shaft of the continuously variable transmission device can be set to zero. If the rotation speed of the electric motor is increased in a direction opposite to the previous direction from this state, the first input element of the planetary gear mechanism connected to the output shaft of the continuously variable transmission device can be rotated in the direction opposite to the rotational direction of the rotational element, that is, in the same direction as the rotational direction of the second input element and the output element, and the rotation speed can be increased. At this time, if the transmission state of the continuously variable transmission device is further changed to the acceleration side, the rotation speed of the first input element can be further increased. With increasing rotation speed of the first input element of the planetary gear mechanism in the direction opposite to the rotational direction of the rotational element, the transmission gear ratio between the rotational element and the output element (drive shaft) of the planetary gear mechanism can be further reduced (a speed increasing ratio can be further increased) to further increase the rotation speed of the drive shaft in the forward direction. As such, the drive shaft rotates in the forward direction when the output element of the planetary gear mechanism rotates in the direction opposite to the rotational direction of the rotational element. Thus, the rotation speed of the first input element is continuously changed within a range including zero to prevent an excessive rotation speed of each element (particularly, the first input element) of the planetary gear mechanism, allow the drive shaft to rotate in the forward direction and the reverse direction, and allow a wider range of the transmission gear ratio between the power generation source or the electric motor and the drive shaft to increase energy efficiency and torque characteristic in a broad operation region in the forward direction of the drive shaft.

The power output apparatus may further include: a required driving force setting module that sets a required driving force required by the drive shaft; and a control module that controls the power generation source, the electric motor, and the continuously variable transmission device so that power based on the set required driving force is outputted to the drive shaft in a state where said connection and disconnection device connects the rotational element to the input shaft of the continuously variable transmission device, and controls the power generation source, the electric motor, and the continuously variable transmission device so that the electric motor decelerates, or the electric motor rotates in the direction opposite to the rotational direction of the rotational element and the power based on the set required driving force is outputted to the drive shaft in a state where the connection and disconnection device disconnects said rotational element from the input shaft of the continuously variable transmission device.

The power output apparatus may further include; a first element fixation device that can fix the first input element of the planetary gear mechanism in a non-rotatable manner. Thus, for example, the rotation speed of the electric motor connected to the input shaft of the continuously variable transmission device is reduced and the electric motor is once stopped, and the rotation speed of the first input element of the planetary gear mechanism connected to the output shaft of the continuously variable transmission device is set to zero in the state where the connection and disconnection device disconnects the rotational element from the input shaft of the continuously variable transmission device, thereby allowing the first element fixation device to fix the first input element in a non-rotatable manner. The first input element of the planetary gear mechanism is thus fixed in a non-rotatable manner, and thus power from the power generation source can be transmitted to the drive shaft via the rotational element and the planetary gear mechanism without using the continuously variable transmission device. Thus, the power from the power generation source can be efficiently transmitted to the drive shaft without a loss in the continuously variable transmission device, thereby further increasing energy efficiency of the power output apparatus.

The control module may control the power generation source so that the power based on the set required driving force is outputted to the drive shaft in a state where the connection and disconnection device disconnects the rotational element from the input shaft of the continuously variable transmission device and the first element fixation device fixes the first input element of the planetary gear mechanism in a non-rotatable manner.

The power output apparatus may further include: a second element fixation device that can fix the second input element of the planetary gear mechanism in a non-rotatable manner. Thus, the second element fixation device fixes the second input element of the planetary gear mechanism in a non-rotatable manner in the state where the connection and disconnection device disconnects the rotational element from the input shaft of the continuously variable transmission device, thereby allowing power from the electric motor to be outputted to the drive shaft via the continuously variable transmission device while preventing following rotation of the power generation source.

The control module may control the electric motor and the continuously variable transmission device so that the power based on the set required driving force is outputted to the drive shaft in a state where the connection and disconnection device disconnects the rotational element from the input shaft of the continuously variable transmission device and the second element fixation device fixes the second input element of the planetary gear mechanism in a non-rotatable manner.

The power generation source may be an internal combustion engine. Specifically, the power output apparatus according to the present invention may be configured as a so-called one-motor one-engine power output apparatus including a combination of an internal combustion engine and one electric motor.

The power generation source may be a second electric motor different from the electric motor. Specifically, the power output apparatus according to the present invention may be configured as a so-called two-motor power output apparatus.

The planetary gear mechanism may be a single pinion planetary gear mechanism including a sun gear as the first input element, a ring gear as the second input element, and a carrier as the output element holding a pinion gear that meshes with both the sun gear and the ring gear. This allows the power output apparatus to have a compact configuration while preventing an increase in the number of components.

The present invention is directed to a vehicle including drive wheels connected to a drive shaft. The vehicle includes: a power generation source that can output power to a predetermined rotational element; a continuously variable transmission device that can steplessly change the speed of power inputted to an input shaft and output the power to an output shaft; a planetary gear mechanism including a first input element connected to the output shaft of the continuously variable transmission device, a second input element that can rotate in a direction opposite to a rotational direction of the rotational element in conjunction with the rotational element, and an output element connected to the drive shaft; a connection and disconnection device that connects and disconnects the rotational element to and from the input shaft of the continuously variable transmission device; an electric motor that can output at least power to the input shaft of the continuously variable transmission device; and an accumulator that can supply and receive electric power to and from the electric motor.

In the vehicle, the rotational element, the continuously variable transmission device, and the planetary gear mechanism cooperate to constitute a so-called infinitely variable transmission (IVT) when the connection and disconnection device connects the rotational element to the input shaft of the continuously variable transmission device, and power from at least one of the power generation source and the electric motor is outputted separately from the rotational element and the continuously variable transmission device to the planetary gear mechanism to cause torque circulation, and thus a transmission gear ratio between the rotational element and the output element (drive shaft) of the planetary gear mechanism can be set to be theoretically infinite. Specifically, in the vehicle, the continuously variable transmission device is used to set the transmission gear ratio between the rotational element and the output element of the planetary gear mechanism to be substantially infinite, and thus the vehicle can be stopped by stopping the rotation of the output element and the drive shaft even if the power generation source connected to the rotational element is operated, for example, at any rotation speed at which efficiency can be increased. If a transmission state of the continuously variable transmission device is changed from the state where the transmission gear ratio is substantially infinite, the vehicle can be driven in a forward direction or a reverse direction by rotating the output element and the drive shaft in a forward direction or a reverse direction. Particularly, when the rotation speed of the drive shaft is low or the vehicle speed is low, torque from at least one of the power generation source and the electric motor can be amplified to efficiently output high torque to the drive shaft. When the connection and disconnection device disconnects the rotational element from the input shaft of the continuously variable transmission device, the electric motor can rotate the input shaft of the continuously variable transmission device independently of the rotation of the rotational element. Thus, in the vehicle, the rotation of the electric motor connected to the input shaft of the continuously variable transmission device is controlled and further the transmission state of the continuously variable transmission device is changed as appropriate in a state where the rotational element is disconnected from the input shaft of the continuously variable transmission device and the power generation source outputs power, thereby reducing the transmission gear ratio between the rotational element, that is, the power generation source or the electric motor and the output element (drive shaft) of the planetary gear mechanism (increasing a speed increasing ratio). Thus, in the vehicle, a range of the transmission gear ratio between the power generation source or the electric motor and the drive shaft can be increased to increase energy efficiency and torque characteristic in an extremely broad operation region from a low speed region where the rotation speed of the drive shaft is low and a high speed region where the rotation speed is high.

DESCRIPTION OF THE PREFERRED EMBODIMENTS

Hereinafter, the best mode for carrying out the invention will be described with reference to embodiments.

Figure 1:
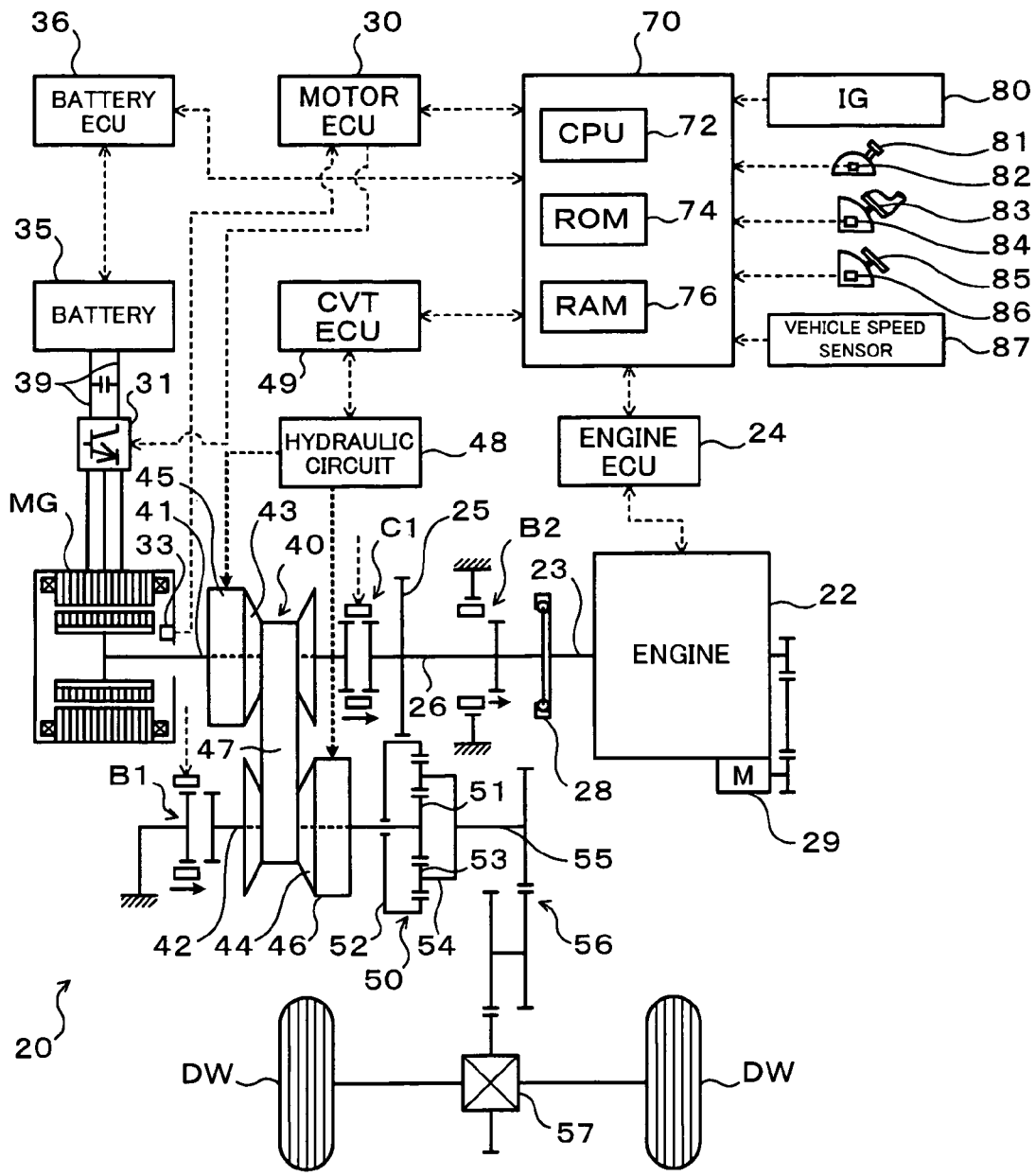
FIG. 1 is a schematic block diagram of a hybrid vehicle according to an embodiment of the present invention.

FIG. 1 is a schematic block diagram of a hybrid vehicle 20 according to an embodiment of the present invention. The shown hybrid vehicle 20 includes: an engine 22 as a power generation source; one motor MG; a battery 35 that can supply and receive electric power to and from the motor MG; a drive gear (rotational element) 25, a belt-type continuously variable transmission unit (hereinafter referred to as "CVT") 40, and a three-element planetary gear mechanism 50 that constitute a so-called infinitely variable transmission; and a hybrid electronic control unit (hereinafter referred to as "hybrid ECU") 70 that controls the entire hybrid vehicle 20.

The engine 22 is an internal combustion engine that receives a supply of hydrocarbon fuel such as gasoline or gas oil and basically rotates in one direction to output power, and is controlled in fuel injection amount, ignition timing, intake air amount, or the like by an engine electronic control unit (hereinafter referred to as "engine ECU") 24. To the engine ECU 24, signals from various sensors, such as an unshown crank position sensor mounted to a crankshaft 23, which are provided in the engine 22 and detect an operation state of the engine 22 are inputted. The engine ECU 24 communicates with the hybrid ECU 70, controls the operation of the engine 22 on the basis of control signals from the hybrid ECU 70 and the signals from the sensors, and outputs data on the operation state of the engine 22 to the hybrid ECU 70 as required. To the crankshaft 23 of the engine 22, a starter motor 29 controlled by the engine ECU 24 is connected via a gear train.

The motor MG is a synchronous motor generator that operates as a generator and can operate as an electric motor, and supplies and receives electric power to and from the battery 35 as a secondary battery via an inverter 31. Specifically, the battery 35 charges and discharges depending on electric power consumed or generated by the motor MG. The motor MG is driven and controlled by a motor electronic control unit (hereinafter referred to as "motor ECU") 30. To the motor ECU 30, signals required for driving and controlling the motor MG such as signals from a rotational position detection sensor 33 that detects a rotational position of a rotor of the motor MG or phase currents applied to the motor MG detected by an unshown current sensor are inputted, and from the motor ECU 30, for example, switching control signals to the inverter 31 are outputted. The motor ECU 30 performs an unshown rotation speed calculation routine on the basis of the signals inputted from the rotational position detection sensor 33, and calculates a rotation speed Nm of the rotor of the motor MG. The motor ECU 30 communicates with the hybrid ECU 70, drives and controls the motor MG on the basis of the control signals from the hybrid ECU 70 and outputs data on an operation state of the motor MG to the hybrid ECU 70 as required.

The battery 35 is controlled by a battery electronic control unit (hereinafter referred to as "battery ECU") 36. To the battery ECU 36, signals required for controlling the battery 35, for example, an inter-terminal voltage from an unshown voltage sensor provided between terminals of the battery 35, charge and discharge currents from an unshown current sensor mounted to a power line 39 connected to an output terminal of the battery 35, and a battery temperature Tb from an unshown temperature sensor mounted to the battery 35 are inputted. The battery ECU 36 outputs data on a state of the battery 35 to the hybrid ECU 70 and the engine ECU 24 by communication as required. Further, for controlling the battery 35, the battery ECU 36 in the embodiment calculates a state of charge SOC on the basis of an integrated value of the charge and discharge currents detected by the current sensor, calculates a charge and discharge power demand Pb* of the battery 35 on the basis of the state of charge SOC, or calculates an input limit Win as a charge allowable electric power that is electric power allowed for charge of the battery 35 and an output limit Wout as a discharge allowable electric power that is electric power allowed for discharge of the battery 35 on the basis of the state of charge SOC and the battery Temperature Tb. The input and output limits Win and Wout of the battery 35 can be set by setting basic values of the input and output limits Win and Wout on the basis of the battery temperature Tb, setting an output limit correction coefficient and an input limit correction coefficient on the basis of the state of charge (SOC) of the battery 35, and multiplying the basic values of the input and output limits Win and Wout by the correction coefficients. To the battery 35, a low pressure battery is connected via an unshown DC/DC converter, and auxiliaries such as the starter motor 29 are driven by electric power from the low voltage battery.

The CVT 40 includes a primary shaft 41 as a drive side rotating shaft (input shaft) connected to the motor MG (a rotor thereof), a secondary shaft 42 as a driven side rotating shaft (output shaft) extending in parallel with the primary shaft 41 and connected to the planetary gear mechanism 50, a primary pulley 43 provided on the primary shaft 41, a secondary pulley 44 provided on the secondary shaft 42, and a belt 47 wound around the primary pulley 43 and the secondary pulley 44. The primary pulley 43 includes a stationary sheave integrally formed with the primary shaft 41 and a movable sheave supported by the primary shaft 41 axially slidably via a ball spline or the like. At the rear of the movable sheave of the primary pulley 43, a hydraulic cylinder (hydraulic actuator) 45 for changing a groove width of the primary pulley 43 is formed. The secondary pulley 44 includes a stationary sheave integrally formed with the secondary shaft 42, and a movable sheave supported by the secondary shaft 42 axially slidably via a ball spline, a return spring, or the like. At the rear of the movable sheave of the secondary pulley 44, a hydraulic cylinder (hydraulic actuator) 46 for changing a groove width of the secondary pulley 44 is formed. Further, in the CVT 40 in the embodiment, an unshown cancel plate that defines a cancel chamber at the rear of the hydraulic cylinder 46 is provided on the secondary pulley 44. A working fluid can be introduced into the cancel chamber defined by the cancel plate and the like, and thus centrifugal hydraulic pressure applied to the working fluid in the cancel chamber can cancel centrifugal hydraulic pressure applied to the hydraulic cylinder 46. To the hydraulic cylinder 45 on the side of the primary pulley 43, and the hydraulic cylinder 46 and the cancel chamber on the side of the secondary pulley 44, the working fluid increased in pressured by an unshown motor oil pump is adjusted in pressure by a hydraulic circuit 48 including a plurality of control valves and supplied, and thus the groove widths of the primary pulley 43 and the secondary pulley 44 can be changed to output power inputted to the primary shaft 41 to the secondary shaft 42 while steplessly changing the speed of the power. The hydraulic circuit 48 can be controlled by a CVT electronic control unit (hereinafter referred to as "CVTECU") 49. The CVTECU 49 communicates with the hybrid ECU 70, receives a rotation speed Ni of the primary shaft 41 and a rotation speed No of the secondary shaft 42 detected by an unshown rotational position detection sensor, and generates and outputs drive signals to the hydraulic circuit 48 on the basis of the control signals from the hybrid ECU 70 and the rotation speeds Ni and No so that a transmission gear ratio γ of the CVT 40 is set to a target value. The CVTECU 49 outputs data on the CVT 40 to the hybrid ECU 70 as required. The CVT 40 is not exclusively driven by the hydraulic circuit 48, but may be driven by an actuator other than the hydraulic circuit 48 such as a motor-driven actuator.

The planetary gear mechanism 50 includes a sun gear (first input element) 51 as an external gear, a ring gear (second input element) 52 as an internal gear arranged concentrically with the sun gear 51, a plurality of pinion gears 53 that mesh with the sun gear 51 and the ring gear 52, and a carrier (output element) 54 that rotatably and revolvably holds the plurality of pinion gears 53, and performs a differential operation with the sun gear 51, the ring gear 52, and the carrier 54 as rotational elements. To the sun gear 51 as the first input element of the planetary gear mechanism 50, the secondary shaft 42 of the CVT 40 is connected, and to the carrier 54 as the output element of the planetary gear mechanism 50, a carrier shaft 55 as a drive shaft is connected. Power outputted to the carrier shaft 55 is finally outputted from the carrier shaft 55 via a gear train 56 and a differential gear 57 to right and left wheels DW as drive wheels. In the embodiment, external teeth are formed on an outer periphery of the ring gear 52 as the second input element of the planetary gear mechanism 50, and the ring gear 52 meshes with the drive gear 25 as the external gear via the external teeth. Thus, the ring gear 52 can rotate in a direction opposite to a rotational direction of the drive gear 25 in conjunction with the drive gear 25. The ring gear 52 may be connected to the drive gear 25 via a gear train including a plurality of gears or a belt.

As shown in FIG. 1, the drive gear 25 that constitutes the infinitely variable transmission together with the CVT 40 and the planetary gear mechanism 50 is fixed to the drive gear shaft 26, and the drive gear shaft 26 is connected to the crankshaft 23 of the engine 22 via a damper 28. The drive gear shaft 26 extends toward the CVT 40 and can be connected to the primary shaft 41 by a clutch C1. In the embodiment, the clutch C1 is configured as a dog clutch including a movable engaging member that can engage with both an engaging portion provided at one end (left end in the drawing) of the drive gear shaft 26 and an engaging portion provided at one end (right end in the drawing) of the primary shaft 41, and is moved forward and backward in an axial direction of the drive gear shaft 26 and the primary shaft 41 by an unshown electromagnetic, electric or hydraulic actuator. Thus, when the clutch C1 is engaged, the drive gear shaft 26 (drive gear 25) can be connected to the primary shaft 41 of the CVT 40, and when the clutch C1 is disengaged, the drive gear shaft 26 can be disconnected from the primary shaft 41.

In addition to the clutch C1, the hybrid vehicle 20 of the embodiment includes a brake B1 for fixing the sun gear 51 as the first input element of the planetary gear mechanism 50 in a non-rotatable manner via the secondary shaft 42 of the CVT 40, and a brake B2 for fixing the drive gear shaft 26 in a non-rotatable manner. In the embodiment, the brake B1 is configured as a dog clutch including a movable engaging member that can engage with both an engaging portion provided at one end (left end in the drawing) of the secondary shaft 42 of the CVT 40 and an engaging portion fixed to an unshown transmission case, and is moved forward and backward in an axial direction of the primary shaft 41 by an unshown electromagnetic, electric or hydraulic actuator. Thus, the brake B1 is applied to engage the movable engaging member with both the engaging portion of the secondary shaft 42 and the engaging portion of the transmission case, thereby allowing the secondary shaft 42 and the sun gear 51 to be fixed in a non-rotatable manner and allowing the CVT 40 to be locked. The brake B2 is configured as a dog clutch including a movable engaging member that can engage with both an engaging portion fixed to the drive gear shaft 26 and an engaging portion fixed to the unshown transmission case, and is moved forward and backward in an axial direction of the drive gear shaft 26 by an unshown electromagnetic, electric or hydraulic actuator. Thus, the brake B2 is applied to engage the movable engaging member with both the engaging portion of the drive gear shaft 26 and the engaging portion of the transmission case, thereby allowing the drive gear shaft 26 to be locked and allowing the ring gear 52 as the second input element of the planetary gear mechanism 50 and the crankshaft 23 of the engine 22 to be fixed in a non-rotatable manner (locked). As described above, the clutch C1 and the brakes B1 and B2 are configured as the dog clutches, and thus members to be connected or separated can be connected or separated with a lower loss. It should be understood that the clutch C1 and the brakes B1 and B2 may be configured as general friction clutches or brakes such as hydraulically driven multi-plate clutches.

Figure 2:
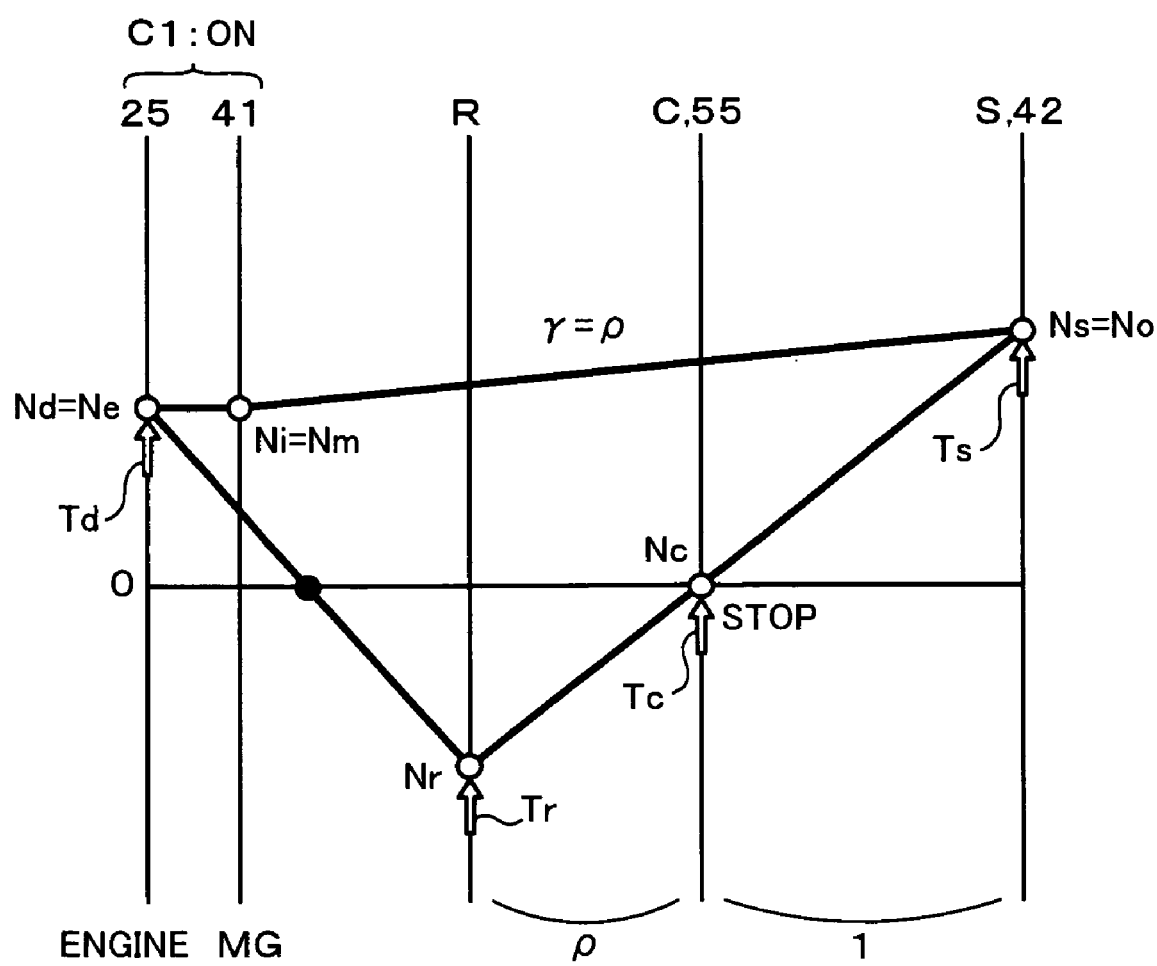
FIG. 2 is an alignment chart illustrating a relationship between rotation speeds or the like of a drive gear, elements of a CVT, and elements of a planetary gear mechanism.

Now, with reference to FIG. 2, a procedure for the drive gear 25, the CVT 40, and the planetary gear mechanism 50 as the infinitely variable transmission to set an infinite transmission gear ratio will be described. In FIG. 2, a 25-axis represents a rotation speed Nd of the drive gear 25 and the drive gear shaft 26 equal to a rotation speed Ne of the engine 22, a 41-axis represents the rotation speed Ni of the primary shaft 41 of the CVT 40 equal to the rotation speed Nm of the motor MG, an R-axis represents a rotation speed Nr of the ring gear 52 of the planetary gear mechanism 50, a C, 55-axis represents a rotation speed Nc of the carrier 54 of the planetary gear mechanism 50 equal to a rotation speed of the carrier shaft 55, and an S, 42-axis represents a rotation speed Ns of the sun gear 51 of the planetary gear mechanism 50 equal to the rotation speed No of the secondary shaft 42 of the CVT 40. In the drawing, ρ represents a gear ratio (the number of teeth of the sun gear 51/the number of teeth of the ring gear 52) of the planetary gear mechanism 50.

As shown in FIG. 2, it is supposed that when the clutch C1 is engaged and the drive gear shaft 26 (drive gear 25) is connected to the primary shaft 41 of the CVT 40, torque Td is applied to the drive gear shaft 26, torque Ts is applied to the sun gear 51, torque Tr is applied to the ring gear 52, and torque Tc is applied to the carrier 54. Further, when the transmission gear ratio of the CVT 40 is denoted by γ(=Ni/Ns=Nm/Ns), relational expressions representing a balance of torque in the following formulas (1) to (3) are satisfied and relational expressions representing rotation speeds in the formulas (4) to (6) are satisfied. These formulas (1) to (6) can be organized to obtain relational expressions in the following formulas (7) to (10). The formula (7) represents a transmission gear ratio α between the drive gear 25 as the rotational element and the carrier 54 (carrier shaft 55) as the output element of the planetary gear mechanism 50. The transmission gear ratio α becomes infinite when the transmission gear ratio γ of the CVT 40 becomes equal to the gear ratio ρ of the planetary gear mechanism 50 (γ=ρ). At this time, the carrier 54 stops without rotating at whatever rotation speed the drive gear 25 is rotating, and as is clear from the formulas (8) to (10), torque applied to each element of the planetary gear mechanism 50 becomes theoretically infinite. Thus, in a state where the clutch C1 connects the drive gear shaft 26 to the primary shaft 41 of the CVT 40, even if the drive gear 25 is rotated by the power from the engine 22, the CVT 40 is controlled so that the transmission gear ratio γ of the CVT 40 becomes equal to the gear ratio ρ of the planetary gear mechanism 50, thereby allowing rotation of the carrier shaft 55 as the drive shaft to be stopped and allowing the hybrid vehicle 20 to be maintained in a stopped state.

$$Tr = Tc/(1+\rho) \quad (1)$$

$$Ts = \rho \cdot Tc/(1+\rho) \quad (2)$$

$$Td = Ts/\gamma - Tr \quad (3)$$

$$Nr = (1+\rho) \cdot Nc - \rho \cdot Ns \quad (4)$$

$$Nd = \gamma \cdot Ns \quad (5)$$

$$Nr = -Nd \quad (6)$$

$$Nd/Nc = (1+\rho)/(\rho/\gamma - 1) = \alpha \quad (7)$$

$$Tc = Td \cdot (1+\rho)/(\rho/\gamma - 1) \quad (8)$$

$$Ts = Td \cdot \rho/(\rho/\gamma - 1) \quad (9)$$

$$Tr = Td/(\rho/\gamma - 1) \quad (10)$$

In the hybrid vehicle 20 of the embodiment, as is clear from FIG. 2, when the engine 22 is operated, the drive gear 25 as the rotational element rotates in the same direction as the rotational direction of the crankshaft 23 of the engine 22, and the ring gear 52 of the planetary gear mechanism 50 that meshes with the drive gear 25 rotates in a direction opposite to the rotational direction of the drive gear 25. At this time, the carrier 54 as the output element of the planetary gear mechanism 50 can rotate both in the same direction as and the direction opposite to the rotational direction of the drive gear 25 depending on the rotational direction of the sun gear 51 as the first input element of the planetary gear mechanism 50. In the embodiment, in terms of preventing an excessive rotation speed of each element (particularly, the sun gear 51) of the planetary gear mechanism 50, when the carrier 54 of the planetary gear mechanism 50 rotates in the direction opposite to the rotational direction of the drive gear 25 (in the same direction as the rotational direction of the ring gear 52), the carrier shaft 55 as the drive shaft (directly) connected to the carrier 54 as the output element rotates in a forward direction, and the wheels DW as drive wheels connected to the carrier shaft 55 via the gear train 56 and the differential gear 57 rotate to advance the hybrid vehicle 20.

The hybrid ECU 70 is configured as a microprocessor mainly including a CPU 72, a ROM 74 that stores a processing program, a RAM 76 that temporarily stores data, and unshown input and output ports and communication ports. To the hybrid ECU 70, an ignition signal from an ignition switch (start switch) 80, a shift position SP from a shift position sensor 82 that detects a shift position SP that is an operation position of a shift lever 81, an accelerator opening Acc from an accelerator pedal position sensor 84 that detects a depression amount of an accelerator pedal 83, a brake pedal stroke BS from a brake pedal stroke sensor 86 that detects a depression amount (stroke) of a brake pedal 85, and a vehicle speed V from a vehicle speed sensor 87 are inputted via an input port. As described above, the hybrid ECU 70 is connected to the engine ECU 24, the motor ECU 30, the battery ECU 36, and the CVTECU 49 via the communication ports, and transmits and receives various control signals and data to and from the engine ECU 24, the motor ECU 30, the battery ECU 36, and the CVTECU 49. Unshown actuators of the clutch C1 and the brakes B1 and B2 are also controlled by the hybrid ECU 70.

Figure 3:
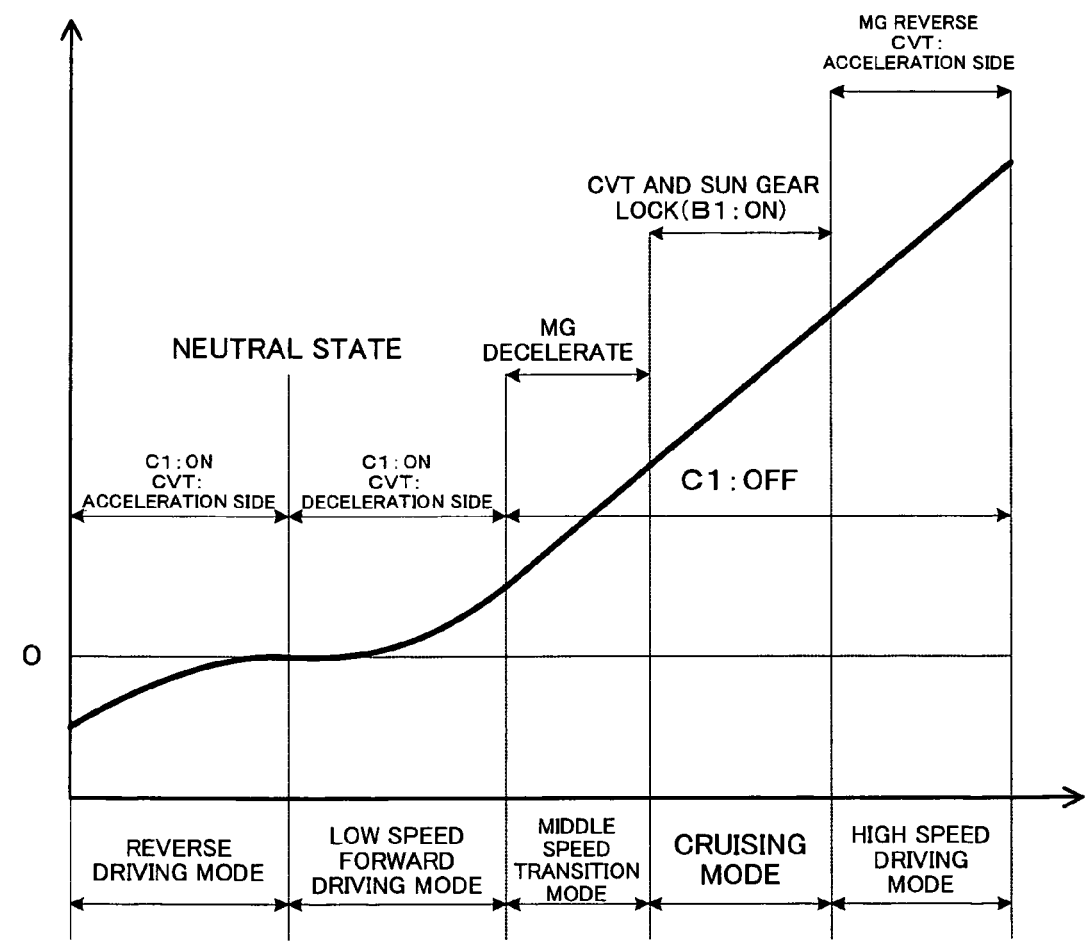
FIG. 3 illustrates an operation mode of the hybrid vehicle of the embodiment.

In running the hybrid vehicle 20 configured as described above, the hybrid ECU 70 sets torque demand to be outputted to the carrier shaft 55 as the drive shaft on the basis of the accelerator opening Acc according to the depression amount of the accelerator pedal 83 by a driver and the vehicle speed V, and sets an operation point of the engine 22, a torque command to the motor MG, and a target transmission gear ratio of the CVT 40 so that torque based on the torque demand (for example, a value of the torque demand limited by the input and output limits of the battery 35 and basically a value equal to the torque demand) is outputted to the carrier shaft 55 as the drive shaft. The control signals indicating the operation point of the engine 22, the torque command to the motor MG, and the target transmission gear ratio thus set are transmitted from the hybrid ECU 70 to the engine ECU 24, the motor ECU 30, and the CVTECU 49. Each ECU individually controls the engine 22, the motor MG, and the CVT 40 according to the control signals from the hybrid ECU 70. The hybrid ECU 70 controls on/off of the clutch C1 and the brakes B1 and B2 as required. As shown in FIG. 3, an operation control mode of the hybrid vehicle 20 includes a reverse driving mode, a low speed forward driving mode, a middle speed transition mode, a cruising mode, and a high speed driving mode, and also includes a motor driving mode where the engine 22 is stopped and the motor MG is used to output power to the carrier shaft 55 as the drive shaft.

Next, an operation of the hybrid vehicle 20 will be described in detail. With reference to FIGS. 4 to 11, an example of an operation when the hybrid vehicle 20 runs with an operation of the engine 22 will be first described.

When the driver turns on an ignition switch 80 with the hybrid vehicle 20 being stopped, a start processing of the engine 22 using the starter motor 29 is performed under collective control by the hybrid ECU 70 except when the hybrid vehicle 20 is started in the motor driving mode. When the hybrid vehicle 20 is stopped, the engine 22 can be started in both a state where the clutch C1 is disengaged and a state where the clutch C1 is engaged.

Figure 4:
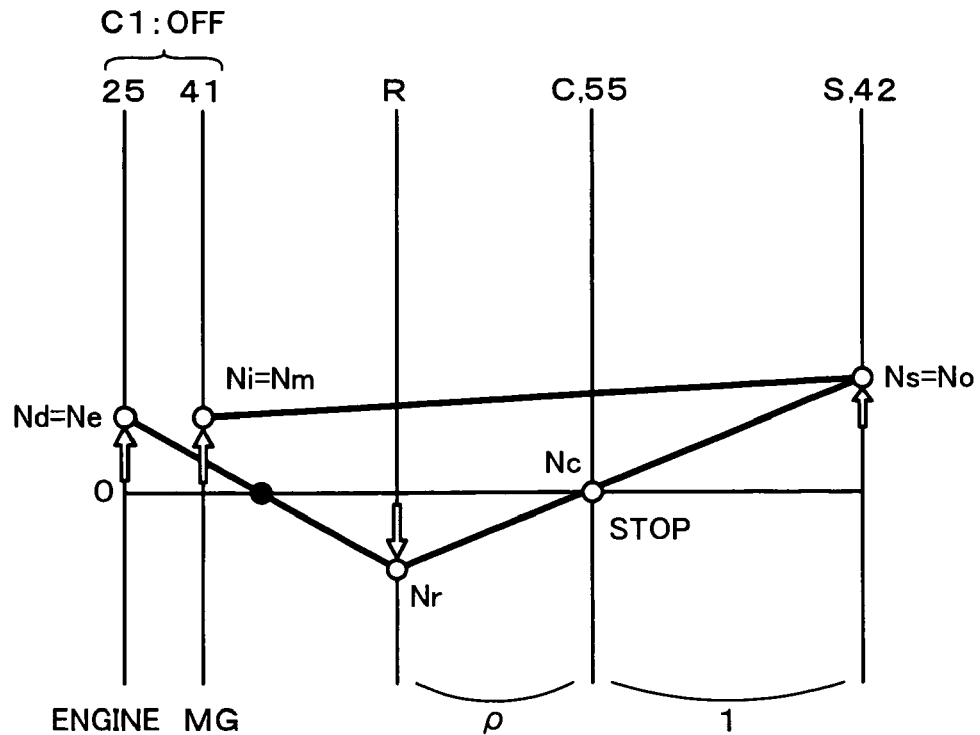
FIG. 4 is an alignment chart illustrating a relationship between rotation speeds or the like of the drive gear, the elements of the CVT, and the elements of the planetary gear mechanism when an engine is started in the hybrid vehicle of the embodiment.

When the engine 22 is started in a state where the clutch C1 is disengaged and the drive gear shaft 26 is disconnected from the primary shaft 41 of the CVT 40, the starter motor 29 is controlled so as to crank the engine 22 using electric power from an unshown low voltage battery, and at least the motor MG is controlled so that torque applied to the carrier 54 as the output element by the starter motor 29 cranking the engine 22 is cancelled to maintain the carrier shaft 55 in a stopped state. Then, fuel injection control and ignition control are started at predetermined timing after the start of cranking by the starter motor 29, and the start processing of the engine 22 is completed at the time when complete explosion of the engine 22 is confirmed. FIG. 4 is an alignment chart illustrating a dynamic relationship between rotation speeds and torque of the drive gear 25 and the rotational elements of the CVT 40 and the planetary gear mechanism 50 when the engine 22 is started with the clutch C1 being disengaged. As is clear from FIG. 4, when the engine 22 is started with the clutch C1 being disengaged, the motor MG outputs upward (positive) torque (power running) in FIG. 4 so as to cancel torque applied to the carrier 54. At this time, the transmission gear ratio $\gamma$ of the CVT 40 may be fixed at a predetermined value or adjusted according to output torque of the motor MG.

Figure 5:
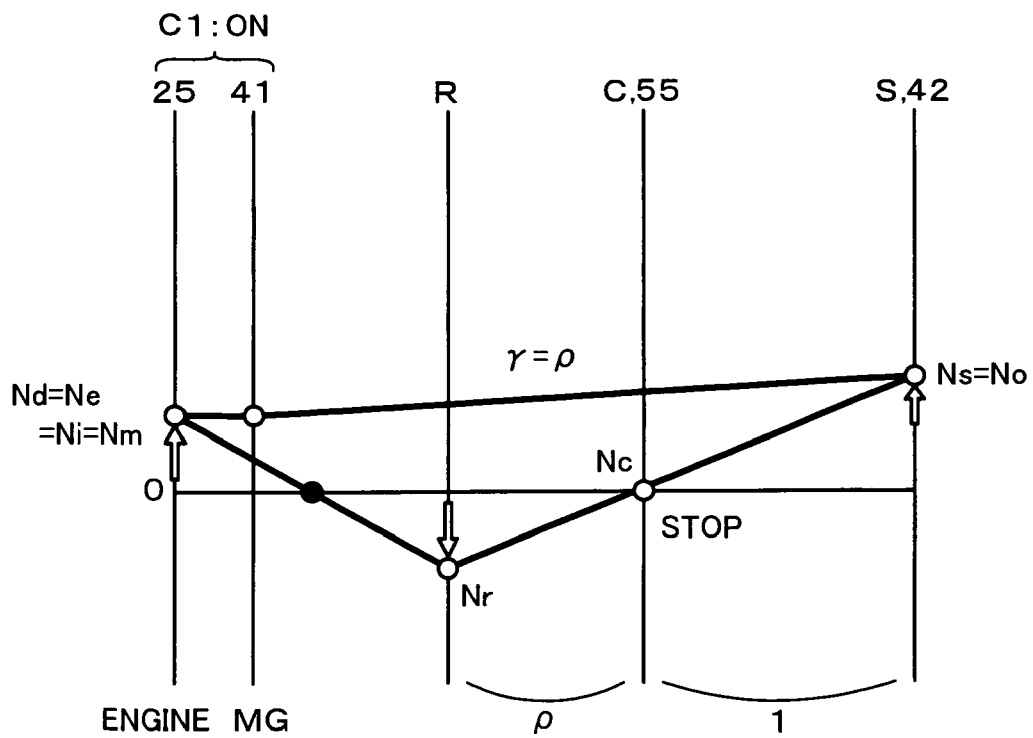
FIG. 5 illustrates another alignment chart showing a relationship between rotation speeds or the like of the drive gear, the elements of the CVT, and the elements of the planetary gear mechanism when the engine is started in the hybrid vehicle of the embodiment.

When the engine 22 is started in a state where the clutch C1 is engaged and the drive gear shaft 26 is connected to the primary shaft 41 of the CVT 40, the starter motor 29 is controlled so as to crank the engine 22 using electric power from an unshown low voltage battery, and the CVT 40 is controlled so that the torque applied to the carrier 54 as the output element is cancelled on the basis of torque outputted to the sun gear 51 of the planetary gear mechanism 50 via the CVT 40 with the cranking of the engine 22 by the starter motor 29. Also in this case, fuel injection control and ignition control are started at predetermined timing after the start of cranking by the starter motor 29, and the start processing of the engine 22 is completed at the time when complete explosion of the engine 22 is confirmed. FIG. 5 is an alignment chart illustrating a dynamic relationship between rotation speeds and torque of the drive gear 25 and the rotational elements of the CVT 40 and the planetary gear mechanism 50 when the engine 22 is started with the clutch C1 being engaged. As shown in FIG. 5, when the engine 22 is started with the clutch C1 being engaged, it is only necessary that the CVT 40 is controlled so that the transmission gear ratio between the primary shaft 41 (drive gear 25) and the sun gear 51 of the planetary gear mechanism 50, that is, the transmission gear ratio $\gamma$ of the CVT 40 becomes always equal to the gear ratio $\rho$ of the planetary gear mechanism 50 during cranking by the starter motor 29, and the transmission gear ratio $\alpha$ between the drive gear 25 and the carrier 54 (carrier shaft 55) of the planetary gear mechanism 50 is set to be substantially infinite.

Figure 6:
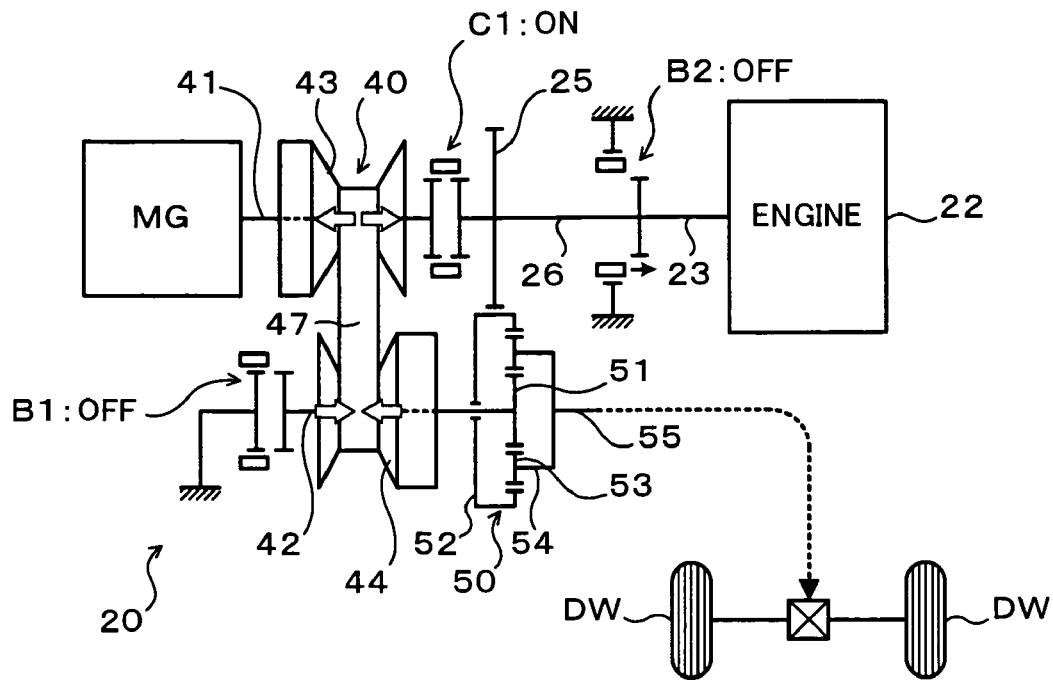
FIG. 6 illustrates a reverse driving mode and a low speed forward driving mode of the hybrid vehicle of the embodiment.
Figure 7:
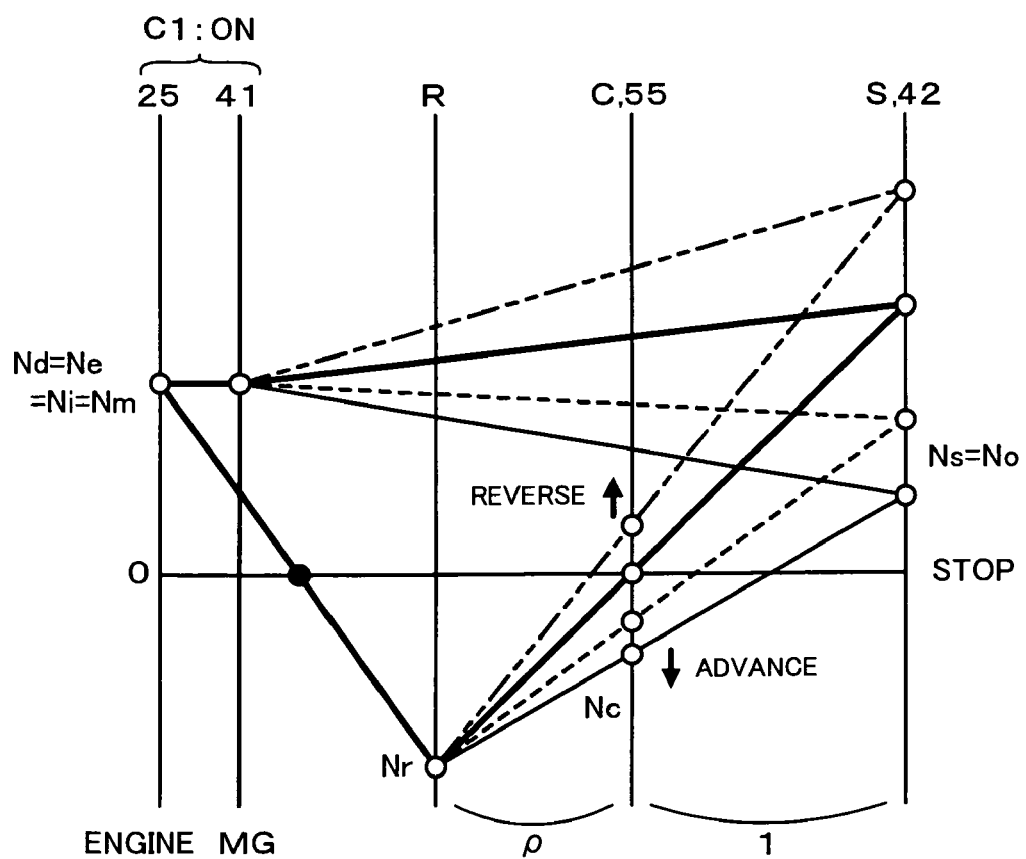
FIG. 7 is an alignment chart illustrating a relationship between rotation speeds or the like of the drive gear, the elements of the CVT, and the elements of the planetary gear mechanism in the reverse driving mode and the low speed forward driving mode.
Figure 8:
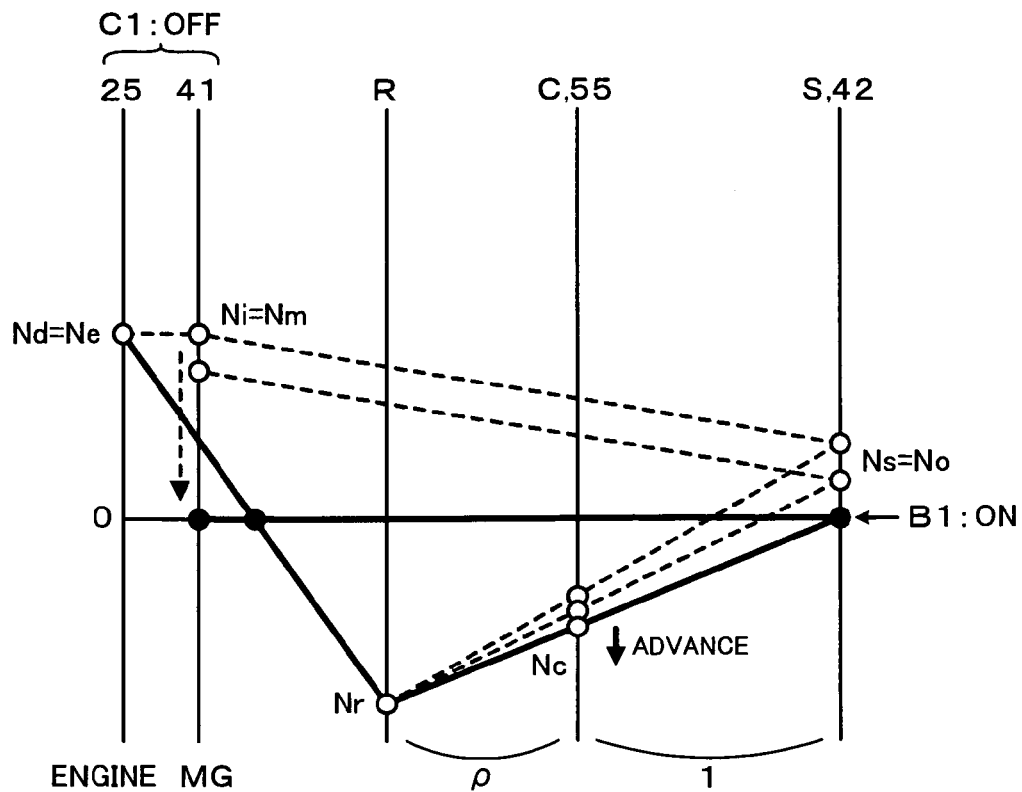
FIG. 8 is an alignment chart illustrating a relationship between rotation speeds or the like of the drive gear, the elements of the CVT, and the elements of the planetary gear mechanism in a middle speed transition mode and a cruising mode.

When the engine 22 is thus started, and in the case where the clutch C1 is disengaged and the drive gear shaft 26 is disconnected from the primary shaft 41 of the CVT 40, the motor MG and the CVT 40 are controlled so that the rotation speed Ni of the primary shaft 41 becomes equal to the rotation speed Nd of the drive gear shaft 26 and the carrier shaft 55 as the drive shaft is maintained in the stopped state, and at the time when the drive gear shaft 26 and the primary shaft 41 synchronously rotate, the clutch C1 is engaged and the both are connected. In the case where the clutch C1 is engaged and the drive gear shaft 26 is connected to the primary shaft 41 of the CVT 40, the engine 22, the motor MG, and the CVT 40 are controlled so that the rotation speed Nd of the drive gear shaft 26 and the rotation speed Ni of the primary shaft 41 become a predetermined rotation speed at the start, and the carrier shaft 55 as the drive shaft is maintained in the stopped state. The rotation speed of the drive gear shaft 26 (engine 22 or motor MG) at the start is preferably a rotation speed at which the engine 22 can be operated with high efficiency (high fuel efficiency) to obtain relatively high torque. As shown in FIG. 6, a state where the clutch C1 is engaged, the transmission gear ratio $\alpha$ between the drive gear 25 and the carrier 54 (carrier shaft 55) of the planetary gear mechanism 50 is set to be substantially infinite, the rotation speed Nd (rotation speeds Ne and Nm) of the drive gear 25 is set to the rotation speed at the start is hereinafter referred to as a "neutral state". FIG. 7 is an alignment chart illustrating a dynamic relationship between the rotation speeds or the like of the drive gear 25 and the rotational elements of the CVT 40 and the planetary gear mechanism 50 in the neutral state indicated by bold lines. As is clear from FIG. 7, in the neutral state, the ring gear 52 as the second input element of the planetary gear mechanism 50 rotates in the direction opposite to the rotational direction of the drive gear 25 and the rotation speed Nc of the carrier 54 (carrier shaft 55) as the output element becomes zero, and thus the ring gear 52 as the first input element of the planetary gear mechanism 50 rotates in the same direction as the rotational direction of the drive gear 25. In the neutral state, the motor MG does not always need to output torque, and thus the torque command to the motor MG may be set to zero so that the motor MG rotates following the engine 22.

When the engine 22 is started and the neutral state is set as described above, the driver can set a shift position to a D position for normal running and depress the accelerator pedal 83 to start the hybrid vehicle 20 in an advancing direction in the "low speed forward driving mode". The driver can set the shift position to an R position for reverse driving and depress the accelerator pedal 83 in the neutral state to start the hybrid vehicle 20 in a reverse direction in the "reverse driving mode". Now, the "reverse driving mode" will be described, and then the "low speed forward driving mode", the "middle speed transition mode", the "cruising mode", and the "high speed driving mode", will be described in order.

(Reverse Driving Mode)

When the driver sets the R position and depresses the accelerator pedal 83 in the neutral state, the hybrid ECU 70 provides a control signal to the CVTECU 49 so that the transmission gear ratio $\gamma$ of the CVT 40 becomes lower than the gear ratio $\rho$ of the planetary gear mechanism 50, that is, the CVT 40 accelerates the secondary shaft 42 and the sun gear 51 of the planetary gear mechanism 50. The CVTECU 49 controls the hydraulic circuit 48 according to the control signals from the hybrid ECU 70 so as to increase the groove width (reduce a diameter) of the secondary pulley 44 of the CVT 40 or reduce the groove width (increase the diameter) of the primary pulley 43. Thus, as shown by dash-double-dot lines in FIG. 7, the rotation speed Ns of the sun gear 51 in the same direction as the rotational direction of the drive gear 25 increases, and the carrier 54 (carrier shaft 55) as the output element of the planetary gear mechanism 50 rotates in the same direction as the rotational direction of the drive gear 25, thereby allowing the carrier shaft 55 as the drive shaft to be reversed and allowing the hybrid vehicle 20 to run in the reverse direction. At this time, as is clear from the formula (8), torque (Td) outputted from the engine 22 or the like to the drive gear shaft 26 is amplified and outputted to the carrier shaft 55 as the drive shaft upwardly in FIG. 7. As such, in the hybrid vehicle 20 of the embodiment, high torque can be outputted to the carrier shaft 55 as the drive shaft while the engine 22 is being efficiently operated in reverse driving. Thus, in the hybrid vehicle 20 of the embodiment, energy efficiency and torque characteristic in reverse driving can be further increased. Of course, for example, when the driver firmly depresses the accelerator pedal 83 and high torque is required even in the reverse driving mode, the motor MG may be caused to output drive torque so as to assist the engine 22.

(Low Speed Forward Driving Mode)

When the driver sets the D position and depresses the accelerator pedal 83 in the neutral state, the hybrid ECU 70 provides a control signal to the CVTECU 49 so that the transmission gear ratio γ of the CVT 40 becomes higher than the gear ratio ρ of the planetary gear mechanism 50, that is, the CVT 40 decelerates the secondary shaft 42 and the sun gear 51 of the planetary gear mechanism 50. The CVTECU 49 controls the hydraulic circuit 48 according to the control signals from the hybrid ECU 70 so as to reduce the groove width (increase the diameter) of the secondary pulley 44 of the CVT 40, or increase the groove width (reduce the diameter) of the primary pulley 43 (see open arrows in FIG. 6). Thus, as shown by the broken lines in FIG. 7, the rotation speed Ns of the sun gear 51 in the same direction as the rotational direction of the drive gear 25 is reduced, and the carrier 54 (carrier shaft 55) as the output element of the planetary gear mechanism 50 rotates in the direction opposite to the rotational direction of the drive gear 25, thereby allowing the carrier shaft 55 as the drive shaft to rotate in the forward direction and allowing the hybrid vehicle 20 to start in the advancing direction. At this time, as is clear from the formula (8), the torque (Td) outputted from the engine 22 or the like to the drive gear shaft 26 is amplified and outputted to the carrier shaft 55 as the drive shaft downwardly in FIG. 7. As such, in the hybrid vehicle 20 of the embodiment, high torque can be outputted to the carrier shaft 55 as the drive shaft while the engine 22 is being efficiently operated at the start in the advancing direction. Thus, in the hybrid vehicle 20 of the embodiment, energy efficiency and torque characteristic at the start can be further increased. After the start, the CVT 40 is controlled so as to increase the transmission gear ratio γ, and thus high torque can be outputted to the carrier shaft 55 as the drive shaft to accelerate the hybrid vehicle 20 in the advancing direction as shown by the thin solid lines in FIG. 7. Further, in the low speed forward driving mode, the transmission gear ratio γ of the CVT 40 is adjusted and the operation point of the engine 22 is changed to increase the torque from the engine 22, or drive torque is outputted from the motor MG to assist the engine 22, thereby further increasing the torque characteristic in the low speed forward driving mode. The low speed forward driving mode continues until, for example, a first shift condition is satisfied including the transmission gear ratio γ of the CVT 40 being reduced to a predetermined value (for example, a maximum transmission gear ratio), and when the shift condition is satisfied, the operation mode of the hybrid vehicle 20 shifts from the low speed forward driving mode to the middle speed transition mode.

(Middle Speed Transition Mode)

When the shift condition is satisfied according to the driver's operation of the accelerator pedal 83 or the like, the hybrid ECU 70 provides a control signal to the actuator of the clutch C1 so as to disconnect the drive gear shaft 26 from the primary shaft 41 of the CVT 40. Thus, when the clutch C1 is disengaged to disconnect the drive gear shaft 26 from the primary shaft 41 of the CVT 40, the primary shaft 41 can be rotated independently of the drive gear shaft 26, and the hybrid ECU 70 sets the operation point of the engine 22, the torque command to the motor MG, and the target transmission gear ratio of the CVT 40 so that the transmission gear ratio γ of the CVT 40 is maintained at the predetermined value, the rotation speed Nm (rotation speed Ni) of the motor MG is reduced, and torque based on the torque demand is outputted to the carrier shaft 55 as the drive shaft. The engine ECU 24, the motor ECU 30, and the CVTECU 49 control the engine 22, the motor MG, and the CVT 40 according to the control signals from the hybrid ECU 70. Thus, as shown by the broken lines in FIG. 8, the rotation speed Ns of the sun gear 51 of the planetary gear mechanism 50 connected to the motor MG via the CVT 40 is reduced with deceleration of the motor MG. Thus, the rotation speed (vehicle speed V) of the carrier shaft 55 is increased in a forward direction (advancing direction) to once stop the motor MG, thereby allowing the rotation speed Ns of the sun gear 51 of the planetary gear mechanism 50 connected to the secondary shaft 42 of the CVT 40 to be set to zero as shown by the solid lines in FIG. 8. In the middle speed transition mode, the motor MG outputs downward torque in FIG. 8 to generate electric power, the electric power generated by the motor MG is used for charging the battery 35. When the hybrid vehicle 20 is decelerated in the middle speed transition mode, the hybrid ECU 70 sets the operation point of the engine 22, the torque command to the motor MG, and the target transmission gear ratio of the CVT 40 so that the transmission gear ratio γ of the CVT 40 is maintained at the predetermined value, the rotation speed Nm (rotation speed Ni) of the motor MG is increased (accelerated), and torque based on the torque demand is outputted to the carrier shaft 55 as the drive shaft.

(Cruising Mode)

Figure 9:
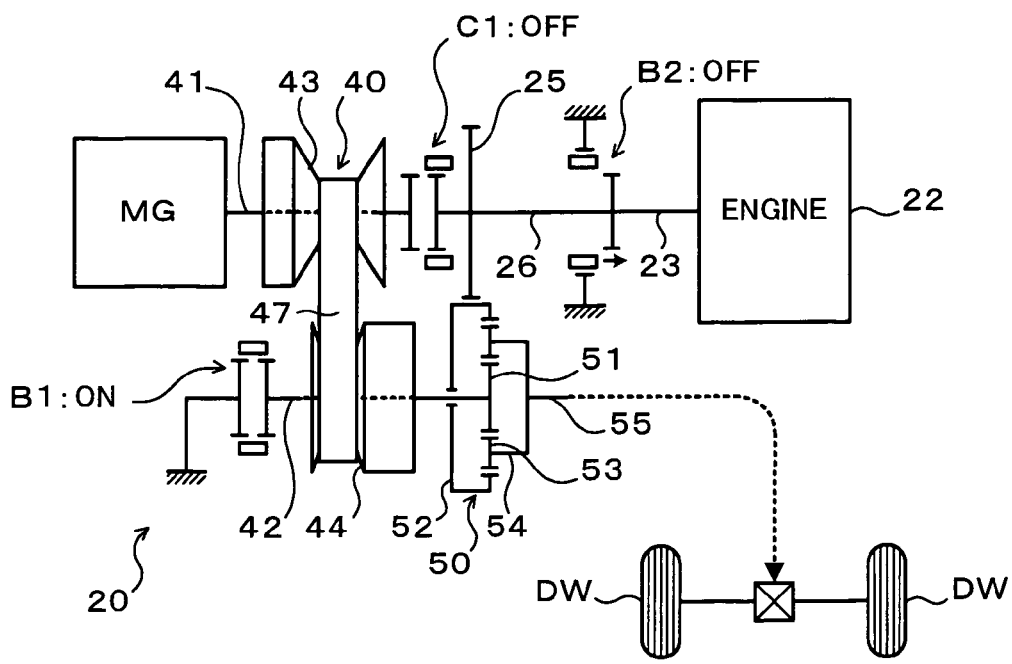
FIG. 9 illustrates the cruising mode of the hybrid vehicle of the embodiment.
Figure 10:
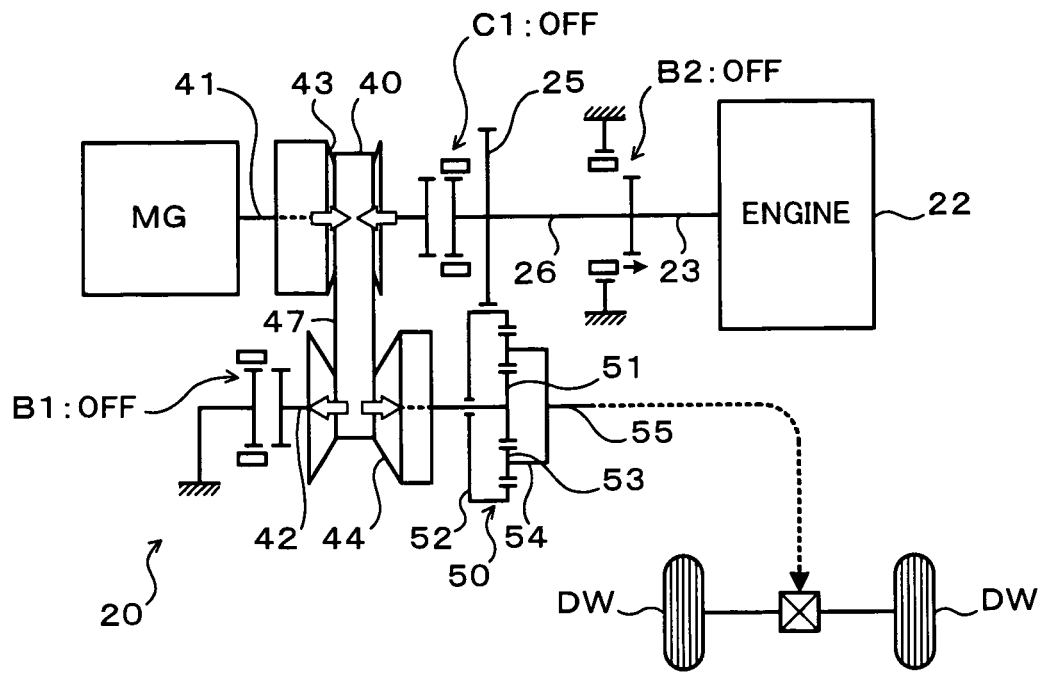
FIG. 10 illustrates a high speed driving mode of the hybrid vehicle of the embodiment.
Figure 11:
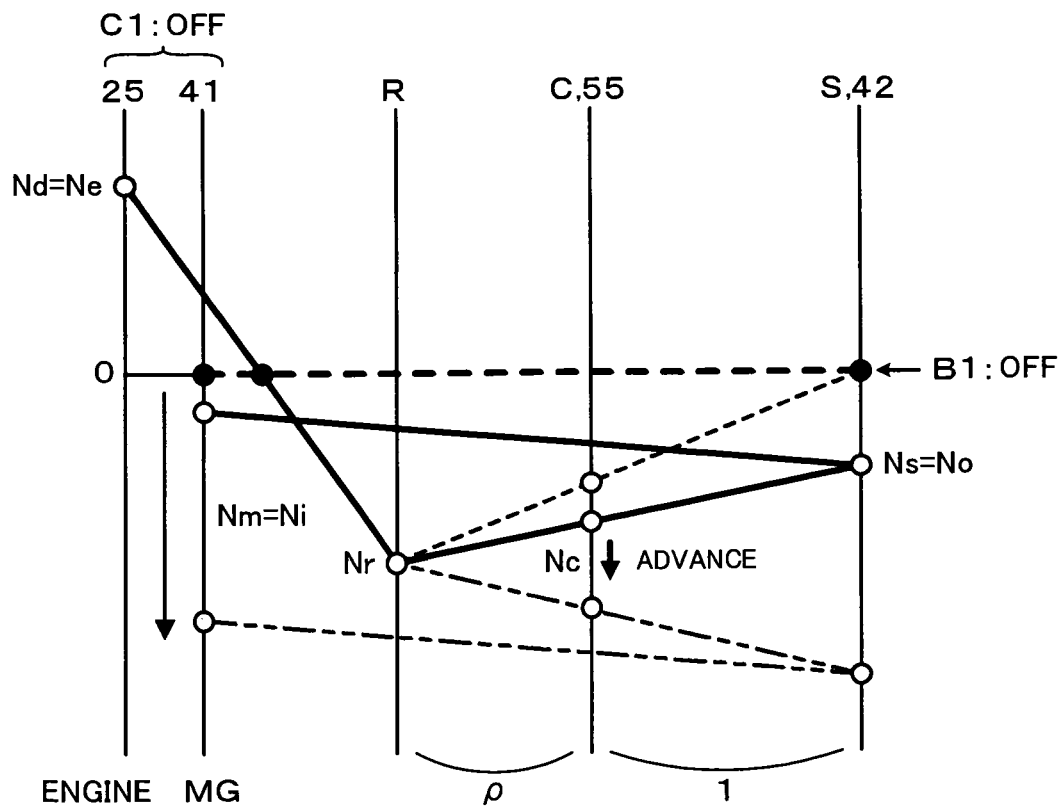
FIG. 11 is an alignment chart illustrating a relationship between rotation speeds or the like of the drive gear, the elements of the CVT, and the elements of the planetary gear mechanism in the high speed driving mode.

When the motor MG connected to the primary shaft 41 of the CVT 40 is stopped and rotation of the sun gear 51 of the planetary gear mechanism 50 connected to the secondary shaft 42 of the CVT 40 is stopped in the middle speed transition mode, as shown in FIG. 9, the brake B1 can be applied to fix the secondary shaft 42 and the sun gear 51 in a non-rotatable manner and lock the CVT 40. The sun gear 51 of the planetary gear mechanism 50 is thus fixed in a non-rotatable manner, and thus as shown by the solid lines in FIG. 8, torque outputted to the drive gear shaft 26 by the engine 22 can be transmitted to the carrier shaft 55 as the drive shaft via the drive gear 25 and the planetary gear mechanism 50 without using the CVT 40. Thus, in the hybrid vehicle 20 of the embodiment, in the case where a running state or a driver's demand (for example, an accelerator opening Acc or the degree of change thereof) when the rotation of the motor MG and the sun gear 51 of the planetary gear mechanism 50 is stopped in the middle speed transition mode satisfies a second shift condition, the hybrid ECU 70 applies the brake B1 to lock the CVT 40 with the motor MG being stopped, and the operation mode shifts from the middle speed transition mode to a cruising shift mode. In the cruising shift mode, the hybrid ECU 70 sets the operation point of the engine 22 so that torque based on the torque demand is outputted to the carrier shaft 55 as the drive shaft, and the engine ECU 24 controls the engine 22 according to the control signals from the hybrid ECU 70. Thus, in the cruising mode, power outputted to the drive gear shaft 26 by the engine 22 can be relatively efficiently transmitted to the carrier shaft 55 as the drive shaft without a loss in the CVT 40, thereby further increasing energy efficiency.

(High Speed Driving Mode)

In the case where a third shift condition different from the second shift condition is satisfied when the motor MG is stopped and the rotation of the sun gear 51 of the planetary gear mechanism 50 is stopped in the middle speed transition mode or the case where the driver makes an acceleration demand in the cruising mode, the operation mode of the hybrid vehicle 20 shifts from the middle speed transition mode or the cruising mode to the high speed driving mode. When the operation mode of the hybrid vehicle 20 is shifted to the high speed driving mode, the hybrid ECU 70 provides a control signal to the actuator of the brake B1 so as to unlock the sun gear 51 of the planetary gear mechanism 50 and the CVT 40 if the brake B1 is applied. With the brake B1 being released (see FIG. 10), the hybrid ECU 70 sets the operation point of the engine 22, the torque command to the motor MG, and the target transmission gear ratio of the CVT 40 so that the motor MG rotates in a direction opposite to the rotational direction in the low speed forward driving mode, that is, in the same direction as the rotational direction of the ring gear 52 and the carrier 54 of the planetary gear mechanism 50, and the torque based on the torque demand is outputted to the carrier shaft 55 as the drive shaft. The engine ECU 24, the motor ECU 30, and the CVTECU 49 control the engine 22, the motor MG, and the CVT 40 according to the control signals from the hybrid ECU 70. Specifically, in the state where the clutch C1 disconnects the drive gear shaft 26 from the primary shaft 41 of the CVT 40, the motor MG can rotate the primary shaft 41 in the direction opposite to the rotational direction of the drive gear shaft 26, and as shown by the solid lines in FIG. 11, the rotation speed Nm (rotation speed Ni) of the motor MG is increased in the direction opposite to the rotational direction of the drive gear 25, that is, in the same direction as the rotational direction of the ring gear 52 of the planetary gear mechanism 50, and thus the sun gear 51 of the planetary gear mechanism 50 connected to the secondary shaft 42 of the CVT 40 can be rotated in the direction opposite to the rotational direction of the drive gear 25, that is, in the same direction as the rotational direction of the ring gear 52 and the carrier 54, and the rotation speed Ns can be increased. Further, as shown by open arrows in FIG. 10, the groove width of the primary pulley 43 of the CVT 40 is reduced or the groove width of the secondary pulley 44 is increased to reduce the transmission gear ratio γ of the CVT 40, and thus as shown by dash-double-dot lines in FIG. 11, the rotation speed Ns of the sun gear 51 of the planetary gear mechanism 50 can be further increased in the direction opposite to the rotational direction of the drive gear 25. With increasing rotation speed Ns of the sun gear 51 of the planetary gear mechanism 50 in the direction opposite to the rotational direction of the drive gear 25, the transmission gear ratio α between the drive gear 25 and the carrier 54 as the output element of the planetary gear mechanism 50, that is, the carrier shaft 55 as the drive shaft can be further reduced (a speed increasing ratio can be further increased) to further increase the rotation speed on the side of the carrier shaft 55, that is, the vehicle speed V.

As described above, in the hybrid vehicle 20 of the embodiment, the rotation speed Ns of the sun gear 51 of the planetary gear mechanism 50 is continuously changed within a range including zero to prevent an excessive rotation speed of each element (particularly, the sun gear 51 as the first input element) of the planetary gear mechanism 50, allow the carrier shaft 55 as the drive shaft to rotate in the forward direction and the reverse direction, that is, allow the hybrid vehicle 20 to run in the advancing direction and the reverse direction, and allow a wider range of the transmission gear ratio between the drive gear 25, that is, the engine 22 or the motor MG and the carrier shaft 55 as the drive shaft in advancing. The operation for accelerating the hybrid vehicle 20 in the advancing direction has been described with reference to FIGS. 4 to 11, but it is only necessary that the engine 22, the motor MG, the CVT 40, the clutch C1, and the brake B1 are controlled in a reverse order to the above described order in decelerating the hybrid vehicle 20 during high speed running.

(Motor Driving Mode)

Next, the motor driving mode will be described where the motor MG outputs power to the carrier shaft 55 as the drive shaft with the engine 22 being stopped to run the hybrid vehicle 20.

Figure 12:
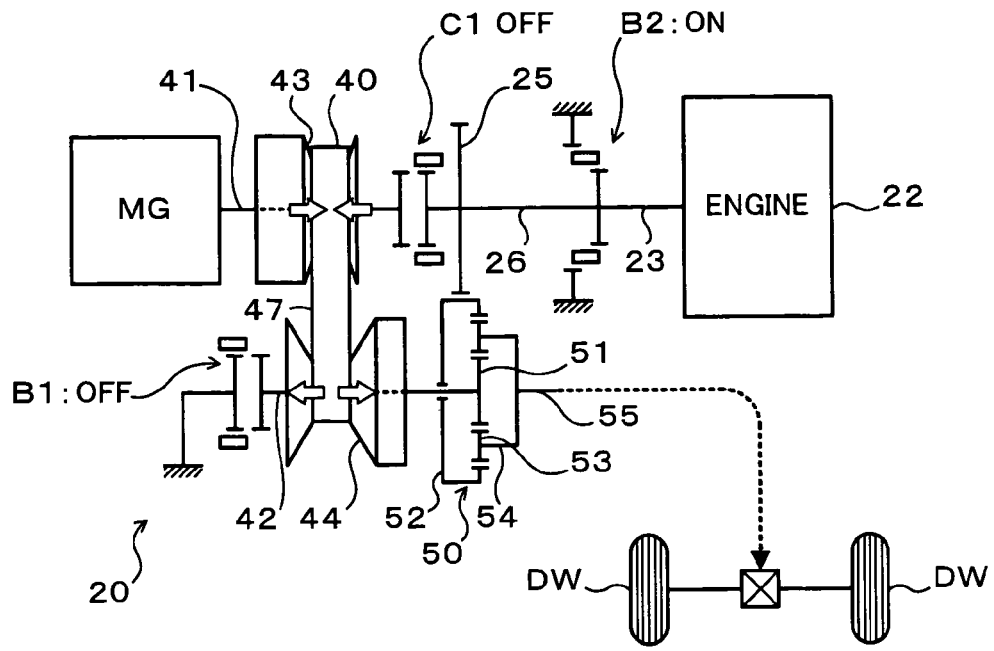
FIG. 12 illustrates a motor driving mode of the hybrid vehicle of the embodiment.
Figure 13:
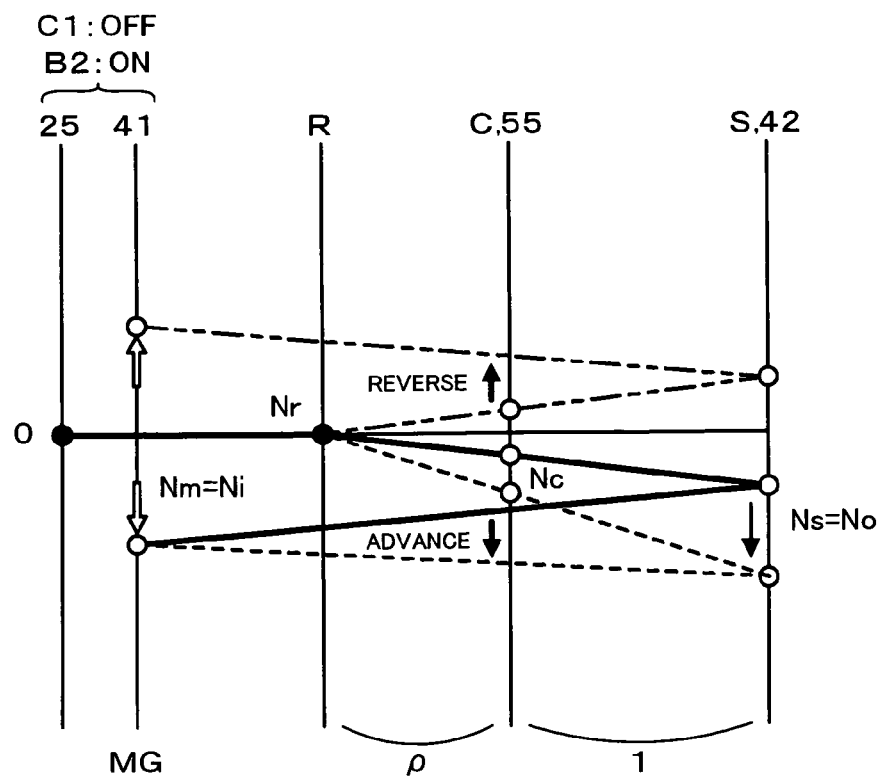
FIG. 13 is an alignment chart illustrating a relationship between rotation speeds or the like of the drive gear, the elements of the CVT, and the elements of the planetary gear mechanism in the motor driving mode.

When the hybrid vehicle 20 of the embodiment is run in the motor driving mode, as shown in FIG. 12, the clutch C1 is disengaged to disconnect the drive gear shaft 26 from the primary shaft 41 of the CVT 40, and the brake B2 is applied to fix (lock) the ring gear 52 as the second input element of the planetary gear mechanism 50 and the crankshaft 23 of the engine 22 in a non-rotatable manner (the brake B1 is released). Thus, power from the motor MG can be outputted to the carrier shaft 55 as the drive shaft without following rotation of the engine 22. In the state where the clutch C1 is disengaged and the brake B2 is applied, the motor MG can be stopped to set a "neutral state" in the motor driving mode. In the neutral state, the transmission gear ratio γ of the CVT 40 is set to a predetermined value (for example, a low value on a deceleration side), and drive control (power running) is performed so that the motor MG is rotated by the electric power from the battery 35 in the same direction as the rotational direction in operating the engine 22 and upward torque is outputted in FIG. 13. Thus, as shown by the dash-double-dot lines in FIG. 13, the sun gear 51 of the planetary gear mechanism 50 rotates in the same direction as the rotational direction of the motor MG, that is, in the rotational direction in operating the engine 22, and thus the carrier 54 (carrier shaft 55) as the output element of the planetary gear mechanism 50 also rotates in the rotational direction in operating the engine 22, thereby allowing the carrier shaft 55 as the drive shaft to be reversed to run the hybrid vehicle 20 in the reverse direction. In the neutral state in the motor driving mode, drive control (power running) is performed so as to rotate the motor MG with the electric power from the battery 35 in the direction opposite to the rotational direction in operating the engine 22 and output downward torque in FIG. 13. Thus, as shown by the solid lines in FIG. 13, the sun gear 51 of the planetary gear mechanism 50 rotates in the same direction as the rotational direction of the motor MG, that is, in the direction opposite to the rotational direction in operating the engine 22, and thus the carrier 54 (carrier shaft 55) as the output element of the planetary gear mechanism 50 also rotates in the direction opposite to the rotational direction in operating the engine 22, thereby allowing the carrier shaft 55 as the drive shaft to be rotated in the forward direction to run the hybrid vehicle 20 in the advancing direction. As shown by the broken lines in FIG. 13, the transmission gear ratio γ of the CVT 40 can be reduced to increase the rotation speed of the carrier shaft 55 as the drive shaft, that is, the vehicle speed V.

When the engine 22 stopped in the motor driving mode is started, the starter motor 29 is controlled so as to crank the engine 22 using electric power from an unshown low voltage battery with the clutch C1 being disengaged, and the motor MG and the CVT 40 are controlled so as to cancel torque applied to the carrier 54 as the output element by the starter motor 29 cranking the engine 22 and output torque based on the torque demand to the carrier shaft 55 as the drive shaft. Then, fuel injection control and ignition control are started at predetermined timing after the start of cranking by the starter motor 29, and when the complete explosion of the engine 22 is confirmed, the torque based on the torque demand is outputted to the carrier shaft 55 as the drive shaft, and the engine 22, the motor MG, and the CVT 40 are controlled so that the drive gear shaft 26 (crankshaft 23) and the primary shaft 41 of the CVT 40 synchronously rotate, and the clutch C1 is engaged at the time when the drive gear shaft 26 and the primary shaft 41 synchronously rotate. When the clutch C1 is thus engaged, control for running the hybrid vehicle 20 is started with the operation of the engine 22.

(Other Operations)

The hybrid vehicle 20 of the embodiment includes the motor MG, and thus when the driver depresses the brake pedal 85, kinetic energy can be converted into electric energy by regeneration of the motor MG to output a braking force (braking torque) to the carrier shaft 55 as the drive shaft. If the clutch C1 is disengaged to disconnect the drive gear shaft 26 from the primary shaft 41 of the CVT 40 when the driver depresses the brake pedal 85, the motor MG can efficiently recover energy. Specifically, the clutch C1 is disengaged and a high rotation speed Nm of the motor MG is maintained using the CVT 40 when the driver depresses the brake pedal 85, and thus energy recovery by the motor MG can be continued when the rotation speed of the carrier shaft 55, that is, the vehicle speed V is reduced to such a level that regenerative braking generally cannot be performed, and thus the energy efficiency of the hybrid vehicle 20 can be increased.

As described above, in the hybrid vehicle 20 of the embodiment, the drive gear 25, the CVT 40, and the planetary gear mechanism 50 cooperate to constitute the infinitely variable transmission (IVT) when the clutch C1 connects the drive gear 25 to the primary shaft 41 of the CVT 40, and power from at least one of the engine 22 and the motor MG is outputted separately from the drive gear 25 and the CVT 40 to the planetary gear mechanism 50 to cause torque circulation, and thus the transmission gear ratio $\alpha$ between the drive gear 25 and the carrier 54 (carrier shaft 55 as the drive shaft) as the output element of the planetary gear mechanism 50 can be set to be theoretically infinite. Thus, in the hybrid vehicle 20, the transmission gear ratio $\gamma$ of the CVT 40 is made equal to the gear ratio $\rho$ of the planetary gear mechanism 50 and the transmission gear ratio $\alpha$ between the drive gear 25 and the carrier 54 of the planetary gear mechanism 50 is set to be substantially infinite. Thus, the rotation of the carrier 54 and the carrier shaft 55 can be stopped even if the engine 22 connected to the drive gear 25 is operated, for example, at any rotation speed at which efficiency can be increased. If the transmission state, that is, the transmission gear ratio $\gamma$ of the of the CVT 40 is changed from the state where the transmission gear ratio $\alpha$ is substantially infinite, the carrier 54 and the carrier shaft 55 can be rotated in the forward direction or the reverse direction. Particularly, when the rotation speed of the carrier shaft 55, that is, the vehicle speed V is low, torque from at least one of the engine 22 and the motor MG can be amplified to efficiently output high torque to the carrier shaft 55 as the drive shaft. When the clutch C1 disconnects the drive gear 25 from the primary shaft 41 of the CVT 40, the motor MG can rotate the primary shaft 41 of the CVT 40 independently of the rotation of the drive gear 25. Thus, in the hybrid vehicle 20, the rotation of the motor MG connected to the primary shaft 41 of the CVT 40 is controlled and further the transmission gear ratio $\gamma$ of the CVT 40 is changed as appropriate in the state where the drive gear 25 is disconnected from the primary shaft 41 of the CVT 40 and the engine 22 outputs power, thereby reducing the transmission gear ratio $\alpha$ between the drive gear 25, that is, the engine 22 or the motor MG and the carrier 54 as the output element of the planetary gear mechanism 50, that is, the carrier shaft 55 as the drive shaft (increasing the speed increasing ratio). Thus, in the hybrid vehicle 20, a range of the transmission gear ratio between the engine 22 or the motor MG and the carrier shaft 55 as the drive shaft can be increased to increase energy efficiency and torque characteristic in an extremely broad operation region from a low speed region where the rotation speed of the carrier shaft 55 is low to a high speed region where the rotation speed is high.

Specifically, in the hybrid vehicle 20, the carrier shaft 55 as the drive shaft rotates in the forward direction when the carrier 54 as the output element of the planetary gear mechanism 50 rotates in the direction opposite to the rotational direction of the drive gear 25, and thus when the carrier shaft 55 rotates in the forward rotation, both the ring gear 52 (second input element) and the carrier 54 (output element) of the planetary gear mechanism 50 rotate in the direction opposite to the rotational direction of the drive gear 25. Thus, in the hybrid vehicle 20, if the transmission gear ratio $\gamma$ of the CVT 40 is made lower than the gear ratio $\rho$ of the planetary gear mechanism 50 (the transmission state of the CVT 40 is changed to the acceleration side) from the state where the transmission gear ratio $\alpha$ between the drive gear 25 and the carrier 54 (carrier shaft 55) of the planetary gear mechanism 50 is set to be substantially infinite, the rotation speed Ns of the sun gear 51 of the planetary gear mechanism 50 connected to the secondary shaft 42 of the CVT 40 is increased, and thus high torque can be outputted to the carrier 54 of the planetary gear mechanism 50 to rotate the carrier 54 in the same direction as the rotational direction of the drive gear 25, that is, high torque can be outputted to the carrier shaft 55 as the drive shaft to reverse the carrier shaft 55 to run the hybrid vehicle 20 in the reverse direction (reverse driving mode). If the transmission gear ratio $\gamma$ of the CVT 40 is made higher than the gear ratio $\rho$ of the planetary gear mechanism 50 (the transmission state of the CVT 40 is changed to the deceleration side) from the state where the transmission gear ratio $\alpha$ between the drive gear 25 and the carrier 54 of the planetary gear mechanism 50 is set to be substantially infinite, the rotation speed Ns of the sun gear 51 of the planetary gear mechanism 50 connected to the secondary shaft 42 of the CVT 40 is reduced, and thus high torque can be outputted to the carrier 54 of the planetary gear mechanism 50 to increase the rotation speed Nc of the carrier 54 in the direction opposite to the rotational direction of the drive gear 25, that is, high torque can be outputted to the carrier shaft 55 as the drive shaft to rotate the carrier shaft 55 in the forward direction and increase the rotation speed (vehicle speed V) to run the hybrid vehicle 20 in the advancing direction (low speed forward driving mode). Further, if the rotation speed Nm of the motor MG connected to the primary shaft 41 of the CVT 40 is reduced and the motor MG is once stopped in the state where the clutch C1 disconnects the drive gear shaft 26 (drive gear 25) from the primary shaft 41 of the CVT 40 (middle speed transition mode), the rotation speed Ns of the sun gear 51 of the planetary gear mechanism 50 connected to the secondary shaft 42 of the CVT 40 can be set to zero. The rotation speed Nm (rotation speed Ni) of the motor MG is increased in the direction opposite to the previous direction (the same direction as the rotational direction of the ring gear 52) from this state, and thus the sun gear 51 of the planetary gear mechanism 50 connected to the secondary shaft 42 of the CVT 40 can be rotated in the direction opposite to the rotational direction of the drive gear 25, that is, in the same direction as the rotational direction of the ring gear 52 and the carrier 54, and the rotation speed Ns can be increased. At this time, the transmission gear ratio $\gamma$ of the CVT 40 is further reduced (the transmission state of the CVT 40 is changed to the acceleration side), the rotation speed Ns of the sun gear 51 can be further increased. Then, with increasing rotation speed of the sun gear 51 of the planetary gear mechanism 50 in the direction opposite to the rotational direction of the drive gear 25, the transmission gear ratio α between the drive gear 25 and the carrier 54 as the output element of the planetary gear mechanism 50, that is, the carrier shaft 55 as the drive shaft can be further reduced (the speed increasing ratio can be further increased) to increase the rotation speed of the carrier shaft 55 as the drive shaft in the forward direction, that is, the vehicle speed V (high speed driving mode).

As such, the carrier shaft 55 as the drive shaft rotates in the forward direction to advance the hybrid vehicle 20 when the carrier 54 of the planetary gear mechanism 50 rotates in the direction opposite to the rotational direction of the drive gear 25, and thus the rotation speed Ns of the sun gear 51 of the planetary gear mechanism 50 is continuously changed within the range including zero to prevent an excessive rotation speed of each element (particularly, the sun gear 51) of the planetary gear mechanism 50, allow the carrier shaft 55 as the drive shaft to rotate in the forward direction and the reverse direction, that is, allow the hybrid vehicle 20 to run in the advancing direction and the reverse direction, and allow a wider range of the transmission gear ratio between the engine 22 or the motor MG and the carrier shaft 55 to increase energy efficiency and torque characteristic in a broad operation region in the forward direction of the carrier shaft 55 as the drive shaft, that is, in the advancing direction of the hybrid vehicle 20. Thus, when the torque demand is set on the basis of the accelerator opening Acc and the vehicle speed V as in the embodiment, in the reverse driving mode or the low speed forward driving mode where the clutch C1 connects the drive gear 25 to the primary shaft 41 of the CVT 40, it is only necessary that the engine 22, the motor MG, and the CVT 40 are controlled so that the torque based on the torque demand is outputted to the carrier shaft 55 as the drive shaft. In the middle speed transition mode or the high speed driving mode where the clutch C1 disconnects the drive gear 25 from the primary shaft 41 of the CVT 40, it is only necessary that the engine 22, the motor MG, and the CVT 40 are controlled so that the motor MG decelerates, or the motor MG rotates in the direction opposite to the rotational direction of the drive gear 25, and torque based on the torque demand is outputted to the carrier shaft 55 as the drive shaft.

The hybrid vehicle 20 of the embodiment includes the brake B1 (first element fixation device) that can fix the sun gear 51 as the first input element of the planetary gear mechanism 50 in a non-rotatable manner. Thus, in the state where the clutch C1 disconnects the drive gear 25 from the primary shaft 41 of the CVT 40, the rotation speed Nm of the motor MG connected to the primary shaft 41 of the CVT 40 is reduced and the motor MG is once stopped, and the rotation speed Ns of the sun gear 51 of the planetary gear mechanism 50 connected to the secondary shaft 42 of the CVT 40 is set to zero, thereby allowing the brake B1 to fix the sun gear 51 in a non-rotatable manner. The sun gear 51 of the planetary gear mechanism 50 (secondary shaft 42 of the CVT 40) is thus fixed in a non-rotatable manner, and thus torque from the engine 22 can be transmitted to the carrier shaft 55 as the drive shaft via the drive gear 25 and the planetary gear mechanism 50 without using the CVT 40 in the cruising mode. Thus, the power from the engine 22 can be relatively efficiently transmitted to the carrier shaft 55 without a loss in the CVT 40, thereby further increasing energy efficiency of the hybrid vehicle 20. Thus, in the cruising mode where the clutch C1 disconnects the drive gear 25 from the primary shaft 41 of the CVT 40 and the brake B1 fixes the sun gear 51 of the planetary gear mechanism 50 in a non-rotatable manner, the engine 22 is preferably controlled so that torque based on the torque demand is outputted to the carrier shaft 55 as the drive shaft.

Further, the hybrid vehicle 20 of the embodiment includes the brake B2 that can lock the drive gear shaft 26 and fix (lock) the ring gear 52 as the second input element of the planetary gear mechanism 50 and the crankshaft 23 of the engine 22 in a non-rotatable manner. Thus, the brake B2 fixes the ring gear 52 of the planetary gear mechanism 50 and the crankshaft 23 of the engine 22 in a non-rotatable manner in the state where the clutch C1 disconnects the drive gear 25 from the primary shaft 41 of the CVT 40, and thus the power from the motor MG can be outputted to the carrier shaft 55 as the drive shaft via the CVT 40 without following rotation of the engine 22.

Further, the single pinion planetary gear mechanism including the sun gear 51 as the first input element, the ring gear 52 as the second input element, the carrier 54 as the output element holding the pinion gears 53 that mesh with both the sun gear 51 and the ring gear 52 is used as the planetary gear mechanism 50, thereby allowing the hybrid vehicle 20 to have a compact configuration while preventing an increase in the number of components.

Figure 14:
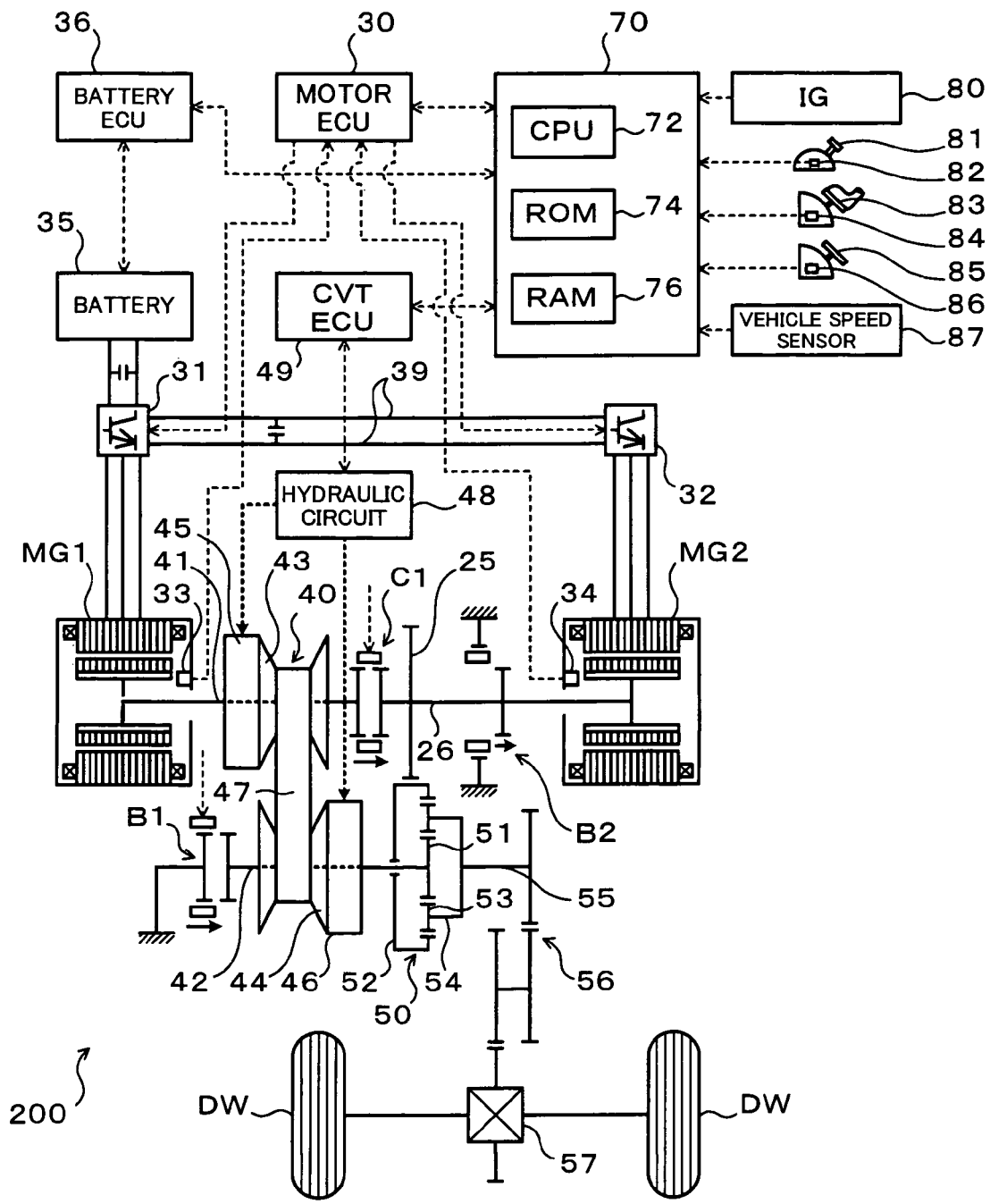
FIG. 14 is a schematic block diagram of an electric vehicle according to a variant.

FIG. 14 is a schematic block diagram of an electric vehicle 200 according to a variant of the present invention. The electric vehicle 200 in FIG. 14 includes a motor MG1 replacing the motor MG in the hybrid vehicle 20 and a motor MG2 replacing the engine 22, the motor MG2 (a rotor thereof) being connected to the drive gear shaft 26 (drive gear 25). In the electric vehicle 200, the motor MG2 is a synchronous motor generator having the same specifications as the motor MG1 that operates as a generator and can operate as an electric motor in the example in FIG. 14, and supplies and receives electric power to and from the battery 35 via an inverter 32. The motor MG2 includes a rotational position detection sensor 34 that detects a rotational position of the rotor. In the electric vehicle 200 thus configured, the motor MG2 connected to the drive gear shaft 26 functions as a power generation source instead of the engine 22 in the hybrid vehicle 20. Specifically, in the electric vehicle 200, the motor MG2 is used as the power generation source and the motor MG1 is operated in the same manner as the motor MG of the hybrid vehicle 20, thereby allowing the electric vehicle 200 to run in the same running modes as the hybrid vehicle 20, including the reverse driving mode, the low speed forward driving mode, the middle speed transition mode, the cruising mode, and the high speed driving mode.

Figure 15:
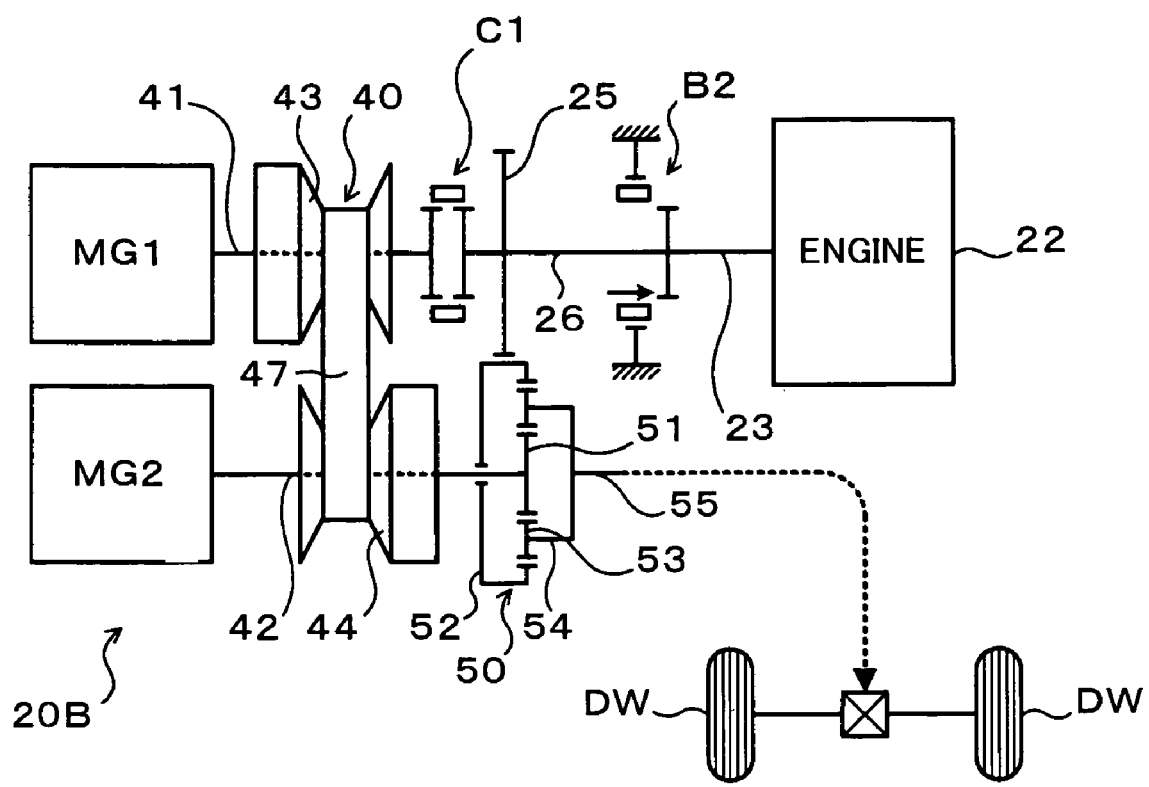
FIG. 15 is a schematic block diagram of a hybrid vehicle according to another variant.

The hybrid vehicle according to the present invention may include two electric motors as a hybrid vehicle 20B according to another variant in FIG. 15. Specifically, the hybrid vehicle 20B in FIG. 15 includes a motor MG1 replacing the motor MG in the hybrid vehicle 20 and a motor MG2 as a second electric motor connected to the secondary shaft 42 of the CVT 40. In this case, the motor MG2 is a synchronous motor generator having the same specifications as the motor MG1 that operates as a generator and can operate as an electric motor in the example in FIG. 15, and supplies and receives electric power to and from a battery as a secondary battery via an unshown inverter. The hybrid vehicle 20B thus configured can control the motor MG1 so as to generate electric power using, for example, part of power from the engine 22, and control the motor MG2 to output drive torque to the secondary shaft 42 of the CVT 40 using electric power obtained by electric power generation by the motor MG1. Further, in the hybrid vehicle 20B of the variant, drive torque can be outputted from both the two motors MG1 and MG2 to the carrier shaft 55 as the drive shaft in the motor driving mode. In the hybrid vehicle 20, a second electric motor and a clutch may be placed between the engine 22 (damper 28) and the drive gear 25 instead of the brake B2. In this case, the clutch may be placed between the engine 22 and the second electric motor, or between the drive gear 25 and the second electric motor. Further, clutches may be placed both between the engine 22 and the second electric motor and between the drive gear 25 and the second electric motor.

In the hybrid vehicle 20 and the electric vehicle 200, the brake B1 may be omitted. Further, in the hybrid vehicle 20 of the embodiment described above, the motor MG2 cranks and starts the engine 22, but the hybrid vehicles 20 and 20B may, of course, include a starter (starter motor) for starting the engine 22. The hybrid vehicles 20 and 20B and the electric vehicle 200 may be configured as vehicles of the type in which the entire cabin including a driver seat is rotated. In the embodiment and the variant described above, the power output apparatus is mounted in the hybrid vehicle 20 and the like, but the power output apparatus according to the present invention may be mounted in vehicles other than automobiles or mobile units such as ships or aircraft, or may be incorporated into fixed facilities such as construction facilities.

Correspondence between main elements in the embodiment and the variant and main elements described in SUMMARY OF THE INVENTION will be described. Specifically, in the embodiment and the variant, the engine 22 as "internal combustion engine" that can output power to the drive gear 25 and the motor MG2 as "second electric motor" correspond to "power generation source", the CVT 40 that can steplessly change the speed of the power inputted to the primary shaft 41 and output the power to the secondary shaft 42 corresponds to "continuously variable transmission device", the planetary gear mechanism 50 including the sun gear 51 connected to the secondary shaft 42 of the CVT 40, the ring gear 52 that can rotate in the direction opposite to the rotational direction of the drive gear 25 in conjunction with the drive gear 25, and the carrier 54 connected to the carrier shaft 55 as the drive shaft corresponds to "planetary gear mechanism", the clutch C1 that connects and disconnects the drive gear 25 to and from the primary shaft 41 of the CVT 40 corresponds to "connection and disconnection device", the motor MG that can output at least power to the primary shaft 41 of the CVT 40 corresponds to "electric motor", and the battery 35 that can supply and receive electric power to and from the motor MG (MG1) and the motor MG2 corresponds to "accumulator". The hybrid ECU 70 that sets the torque demand on the basis of the accelerator opening Acc or the like corresponds to "required driving force setting module", a combination of the hybrid ECU 70, the engine 22, the motor ECU 30, and the CVTECU 49 corresponds to "control module", the brake B1 that can fix the sun gear 51 of the planetary gear mechanism 50 in a non-rotatable manner corresponds to "first element fixation device", and the brake B2 that can lock the drive gear shaft 26 and fix the ring gear 52 as the second input element of the planetary gear mechanism 50 and the crankshaft 23 of the engine 22 in a non-rotatable manner corresponds to "second element fixation device".

The "internal combustion engine" is not limited to the engine 22 that receives hydrocarbon fuel such as gasoline or gas oil and outputs power, but may be of any type such as a hydrogen engine. The "continuously variable transmission device" is not limited to the belt-type CVT 40, but may be of any other type that can steplessly change the speed of power inputted to an input shaft and output the power to an output shaft such as a toroidal-type continuously variable transmission or an electric continuously variable transmission device constituted by a pair-rotor motor. The "planetary gear mechanism" may be of any type other than the single pinion planetary gear mechanism 50 as long as it includes a first input element connected to an output shaft of the continuously variable transmission device, a second input element that can rotate in the direction opposite to the rotational direction of a rotational element in conjunction with the rotational element, and an output element connected to a drive shaft. The "connection and disconnection device", the "first element fixation device", and the "second element fixation device" may be of any type such as friction clutches other than the clutch C1 and the brakes B1 and B2 that are dog clutches as long as they connect and disconnect corresponding elements. The "electric motor" and the "second electric motor" are not limited to the synchronous motor generators such as the motors MG, MG1 and MG2, but may be of any other type such as an induction motor. The "accumulator" is not limited to the secondary battery such as the battery 35, but may be of any other type such as a capacitor as long as it can supply and receive electric power to and from the first and second electric motors. The "control module" may be of any type other than the combination of the hybrid ECU 70, the engine 22, the motor ECU 30, and the CVTECU 49. In any case, the correspondence between the main elements in the embodiment and the variant and the main elements in the invention described in SUMMARY OF THE INVENTION do not limit the elements in the invention described in SUMMARY OF THE INVENTION since the embodiment is an example for describing in detail the best mode for carrying out the invention described in SUMMARY OF THE INVENTION. Specifically, the embodiment is merely a detailed example of the invention described in SUMMARY OF THE INVENTION, and the invention described in SUMMARY OF THE INVENTION should be construed on the basis of the description therein.

Hereinbefore, the embodiments of the present invention have been described with reference to drawings, but the present invention is not limited to the above embodiments. It will be apparent that various modifications can be made to the present invention without departing from the spirit and scope of the present invention.

The disclosure of Japanese Patent Application No. 2008-030592 filed Feb. 12, 2008 including specification, drawings and claims is incorporated herein by reference in its entirety.

What is claimed is:

1. A power output apparatus that outputs power to a drive shaft, said power output apparatus comprising:
    a power generation source that can output power to a predetermined rotational element;
    a continuously variable transmission device that can steplessly change the speed of power inputted to an input shaft and output the power to an output shaft;
    a planetary gear mechanism including a first input element connected to said output shaft of said continuously variable transmission device, a second input element that can rotate in a direction opposite to a rotational direction of said rotational element in conjunction with said rotational element, and an output element connected to said drive shaft;
    a connection and disconnection device that connects and disconnects said rotational element to and from said input shaft of said continuously variable transmission device;
    an electric motor that can output at least power to said input shaft of said continuously variable transmission device; and
    an accumulator that can supply and receive electric power to and from said electric motor.

2. A power output apparatus according to claim 1, wherein said drive shaft rotates in a forward direction when said output element of said planetary gear mechanism rotates in the direction opposite to the rotational direction of said rotational element.

3. A power output apparatus according to claim 2, further comprising:
   a required driving force setting module that sets a required driving force required by said drive shaft; and
   a control module that controls said power generation source, said electric motor, and said continuously variable transmission device so that power based on said set required driving force is outputted to said drive shaft in a state where said connection and disconnection device connects said rotational element to said input shaft of said continuously variable transmission device, said control module controlling said power generation source, said electric motor, and said continuously variable transmission device so that said electric motor decelerates, or said electric motor rotates in the direction opposite to the rotational direction of said rotational element and the power based on said set required driving force is outputted to said drive shaft in a state where said connection and disconnection device disconnects said rotational element from said input shaft of said continuously variable transmission device.

4. A power output apparatus according to claim 3, further comprising;
   a first element fixation device that can fix said first input element of said planetary gear mechanism in a non-rotatable manner.

5. A power output apparatus according to claim 4, wherein said control module controls said power generation source so that the power based on said set required driving force is outputted to said drive shaft in a state where said connection and disconnection device disconnects said rotational element from said input shaft of said continuously variable transmission device and said first element fixation device fixes said first input element of said planetary gear mechanism in a non-rotatable manner.

6. A power output apparatus according to claim 3, further comprising;
   a second element fixation device that can fix said second input element of said planetary gear mechanism in a non-rotatable manner.

7. A power output apparatus according to claim 6, wherein said control module controls said electric motor and said continuously variable transmission device so that the power based on said set required driving force is outputted to said drive shaft in a state where said connection and disconnection device disconnects said rotational element from said input shaft of said continuously variable transmission device and said second element fixation device fixes said second input element of said planetary gear mechanism in a non-rotatable manner.

8. A power output apparatus according to claim 1, wherein said power generation source is an internal combustion engine.

9. A power output apparatus according to claim 1, wherein said power generation source is a second electric motor different from said electric motor.

10. A power output apparatus according to claim 1, wherein said planetary gear mechanism is a single pinion planetary gear mechanism including a sun gear as said first input element, a ring gear as said second input element, and a carrier as said output element holding a pinion gear that meshes with both said sun gear and said ring gear.

11. A vehicle including drive wheels connected to a drive shaft, said vehicle comprising:
   a power generation source that can output power to a predetermined rotational element;
   a continuously variable transmission device that can steplessly change the speed of power inputted to an input shaft and output the power to an output shaft;
   a planetary gear mechanism including a first input element connected to said output shaft of said continuously variable transmission device, a second input element that can rotate in a direction opposite to a rotational direction of said rotational element in conjunction with said rotational element, and an output element connected to said drive shaft;
   a connection and disconnection device that connects and disconnects said rotational element to and from said input shaft of said continuously variable transmission device;
   an electric motor that can output at least power to said input shaft of said continuously variable transmission device; and
   an accumulator that can supply and receive electric power to and from said electric motor.

* * * * *